US011184219B2

(12) United States Patent
Harutyunyan et al.

(10) Patent No.: US 11,184,219 B2
(45) Date of Patent: Nov. 23, 2021

(54) METHODS AND SYSTEMS FOR TROUBLESHOOTING ANOMALOUS BEHAVIOR IN A DATA CENTER

(71) Applicant: VMware, Inc., Palo Alto, CA (US)

(72) Inventors: Ashot Nshan Harutyunyan, Yerevan (AM); Naira Movses Grigoryan, Yerevan (AM); Arnak Poghosyan, Yerevan (AM); Hovhannes Antonyan, Yerevan (AM); Vardan Hovhannisyan, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/742,239

(22) Filed: Jan. 14, 2020

(65) Prior Publication Data

US 2021/0218619 A1 Jul. 15, 2021

(51) Int. Cl.
*H04L 12/24* (2006.01)
*G06F 16/23* (2019.01)
*G06F 16/25* (2019.01)

(52) U.S. Cl.
CPC ...... *H04L 41/0631* (2013.01); *G06F 16/2379* (2019.01); *G06F 16/252* (2019.01); *H04L 41/12* (2013.01); *H04L 41/22* (2013.01)

(58) Field of Classification Search
CPC ..... H04L 41/0631; H04L 41/12; H04L 41/22; G06F 16/2379; G06F 16/252
See application file for complete search history.

(56) References Cited

U.S. PATENT DOCUMENTS

| | | | |
|---|---|---|---|
| 10,721,142 B1* | 7/2020 | Mathur | H04L 41/5074 |
| 2011/0154119 A1* | 6/2011 | Wang | G06F 11/006 |
| | | | 714/37 |
| 2014/0136684 A1* | 5/2014 | Jain | H04L 65/40 |
| | | | 709/224 |
| 2014/0136690 A1* | 5/2014 | Jain | H04L 41/5012 |
| | | | 709/224 |
| 2017/0373932 A1* | 12/2017 | Subramanian | H04L 41/0853 |
| 2018/0034685 A1* | 2/2018 | Naous | H04L 41/22 |
| 2018/0219743 A1* | 8/2018 | Garcia | H04L 41/12 |
| 2019/0034254 A1* | 1/2019 | Nataraj | G06F 11/079 |

* cited by examiner

*Primary Examiner* — Kristie D Shingles

(57) ABSTRACT

Methods and systems described herein are directed to troubleshooting anomalous behavior in a data center. Anomalous behavior in an object of a data center, such as a computational resource, an application, or a virtual machine ("VM"), may be related to the behavior of other objects at different hierarchies of the data center. Methods and systems provide a graphical user interface that enables a user to select a selected metric associated with an object of the data center experiencing a performance problem. Unexpected metrics of an object topology of the data center that correspond to the performance problem are identified. A recommendation for executing remedial measures to correct the performance problem is generated based on the unexpected metrics.

15 Claims, 39 Drawing Sheets

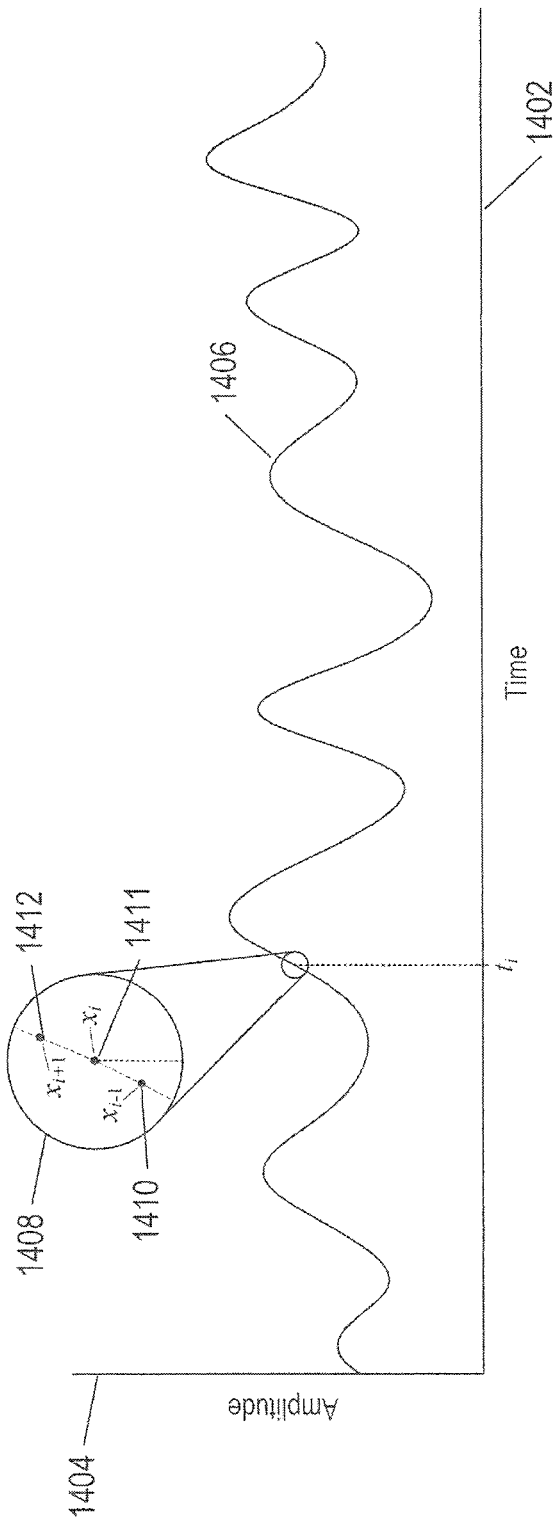

| Rank | Recent correlation values | Recent correlated metric |
|---|---|---|
| 1 | $\rho(v_s, v_{m,C}^2)$ | $v_{m,C}^2$ |
| 2 | $\rho(v_s, v_{m,F}^1)$ | $v_{m,F}^1$ |
| 3 | $\rho(v_s, v_{m,A}^3)$ | $v_{m,A}^3$ |
| 4 | $\rho(v_s, v_{m,E}^1)$ | $v_{m,E}^1$ |
| 5 | $\rho(v_s, v_{m,D}^3)$ | $v_{m,D}^3$ |
| 6 | $\rho(v_s, v_{m,B}^5)$ | $v_{m,B}^5$ |
| 7 | $\rho(v_s, v_{m,B}^2)$ | $v_{m,B}^2$ |
| 8 | $\rho(v_s, v_{m,B}^4)$ | $v_{m,B}^4$ |
| 9 | $\rho(v_s, v_{m,A}^1)$ | $v_{m,A}^1$ |
| 10 | $\rho(v_s, v_{m,D}^4)$ | $v_{m,D}^4$ |
| 11 | $\rho(v_s, v_{m,A}^2)$ | $v_{m,A}^2$ |
| 12 | $\rho(v_s, v_{m,D}^2)$ | $v_{m,D}^2$ |
| 13 | $\rho(v_s, v_{m,C}^3)$ | $v_{m,C}^3$ |
| ⋮ | ⋮ | ⋮ |

Figure 17

| Rank | Historical correlation values | Historical correlated metrics | | Rank | Recent correlation values | Recent correlated metric | | Rank | Unexpected correlated metrics |
|---|---|---|---|---|---|---|---|---|---|
| 1 | $\rho(v_s, v_{m,A}^3)$ | $v_{m,A}^3$ | | 1 | $\rho(v_s, v_{m,C}^2)$ | $v_{m,C}^2$ | | 1 | $v_{m,C}^2$ |
| 2 | $\rho(v_s, v_{m,D}^4)$ | $v_{m,D}^4$ | | 2 | $\rho(v_s, v_{m,F}^1)$ | $v_{m,F}^1$ | | 2 | $v_{m,E}^1$ |
| 3 | $\rho(v_s, v_{m,E}^2)$ | $v_{m,E}^2$ | | 3 | $\rho(v_s, v_{m,A}^3)$ | $v_{m,A}^3$ | | 3 | $v_{m,D}^3$ |
| 4 | $\rho(v_s, v_{m,F}^1)$ | $v_{m,F}^1$ | | 4 | $\rho(v_s, v_{m,E}^1)$ | $v_{m,E}^1$ | | 4 | $v_{m,B}^2$ |
| 5 | $\rho(v_s, v_{m,C}^3)$ | $v_{m,C}^3$ | | 5 | $\rho(v_s, v_{m,D}^3)$ | $v_{m,D}^3$ | | 5 | $v_{m,B}^4$ |
| 6 | $\rho(v_s, v_{m,B}^5)$ | $v_{m,B}^5$ | | 6 | $\rho(v_s, v_{m,B}^5)$ | $v_{m,B}^5$ | | 6 | $v_{m,A}^1$ |
| 7 | $\rho(v_s, v_{m,A}^1)$ | $v_{m,A}^1$ | | 7 | $\rho(v_s, v_{m,B}^2)$ | $v_{m,B}^2$ | | 7 | $v_{m,D}^4$ |
| 8 | $\rho(v_s, v_{m,B}^7)$ | $v_{m,B}^7$ | | 8 | $\rho(v_s, v_{m,B}^4)$ | $v_{m,B}^4$ | | 8 | $v_{m,A}^2$ |
| 9 | $\rho(v_s, v_{m,B}^2)$ | $v_{m,B}^2$ | | 9 | $\rho(v_s, v_{m,A}^1)$ | $v_{m,A}^1$ | | 9 | $v_{m,D}^2$ |
| 10 | $\rho(v_s, v_{m,G}^5)$ | $v_{m,G}^5$ | | 10 | $\rho(v_s, v_{m,D}^4)$ | $v_{m,D}^4$ | | 10 | $v_{m,C}^3$ |
| | | | | 11 | $\rho(v_s, v_{m,A}^2)$ | $v_{m,A}^2$ | | | |
| | | | | 12 | $\rho(v_s, v_{m,D}^2)$ | $v_{m,D}^2$ | | | |
| | | | | 13 | $\rho(v_s, v_{m,C}^3)$ | $v_{m,C}^3$ | | | |
| | | | | ... | ... | ... | | | |

Figure 18

Object: $O_A$ | No. of Top Ranked Metrics: 10 | Metric: $v_s$

| Rank | Correlated metrics | Correlation values | Rating |
|---|---|---|---|
| 1 | $v_{m,C}^2$ | $\rho(v_s, v_{m,C}^2)$ | ☆☆☆☆☆ |
| 2 | $v_{m,E}^1$ | $\rho(v_s, v_{m,E}^1)$ | ☆☆☆☆☆ |
| 3 | $v_{m,D}^3$ | $\rho(v_s, v_{m,D}^3)$ | ☆☆☆☆☆ |
| 4 | $v_{m,B}^2$ | $\rho(v_s, v_{m,B}^2)$ | ☆☆☆☆☆ |
| 5 | $v_{m,B}^4$ | $\rho(v_s, v_{m,B}^4)$ | ☆☆☆☆☆ |
| 6 | $v_{m,A}^1$ | $\rho(v_s, v_{m,A}^1)$ | ☆☆☆☆☆ |
| 7 | $v_{m,D}^4$ | $\rho(v_s, v_{m,D}^4)$ | ☆☆☆☆☆ |
| 8 | $v_{m,A}^2$ | $\rho(v_s, v_{m,A}^2)$ | ☆☆☆☆☆ |
| 9 | $v_{m,D}^2$ | $\rho(v_s, v_{m,D}^2)$ | ☆☆☆☆☆ |
| 10 | $v_{m,C}^3$ | $\rho(v_s, v_{m,C}^3)$ | ☆☆☆☆☆ |

Save

Figure 20A

| Object | | |
|---|---|---|
| $O_A$ | | |

No. of Top Ranked Metrics: 10

Metric: $v_s$

| Rank | Correlated metrics | Correlation values | Rating |
|---|---|---|---|
| 1 | $v_{m,C}^2$ | $\rho(v_s, v_{m,C}^2)$ | ☆☆☆☆☆ |
| 2 | $v_{m,E}^1$ | $\rho(v_s, v_{m,E}^1)$ | ☆☆☆☆☆ |
| 3 | $v_{m,D}^3$ | $\rho(v_s, v_{m,D}^3)$ | ☆☆☆☆☆ |
| 4 | $v_{m,B}^2$ | $\rho(v_s, v_{m,B}^2)$ | ☆☆☆☆☆ |
| 5 | $v_{m,B}^4$ | $\rho(v_s, v_{m,B}^4)$ | ☆☆☆☆☆ |
| 6 | $v_{m,A}^1$ | $\rho(v_s, v_{m,A}^1)$ | ☆☆☆☆☆ |
| 7 | $v_{m,D}^4$ | $\rho(v_s, v_{m,D}^4)$ | ☆☆☆☆☆ |
| 8 | $v_{m,A}^2$ | $\rho(v_s, v_{m,A}^2)$ | ☆☆☆☆☆ |
| 9 | $v_{m,D}^2$ | $\rho(v_s, v_{m,D}^2)$ | ☆☆☆☆☆ |
| 10 | $v_{m,C}^3$ | $\rho(v_s, v_{m,C}^3)$ | ☆☆☆☆☆ |

Save

Figure 20B

| Rank | Unexpected correlated metrics |
|---|---|
| 1 | $v_{m,C}^2$ |
| 2 | $v_{m,E}^1$ |
| 3 | $v_{m,D}^3$ |
| 4 | $v_{m,B}^2$ |
| 5 | $v_{m,B}^4$ |
| 6 | $v_{m,A}^1$ |
| 7 | $v_{m,D}^4$ |
| 8 | $v_{m,A}^2$ |
| 9 | $v_{m,D}^2$ |
| 10 | $v_{m,C}^3$ |

| Rank | Unexpected correlated metrics | Rating |
|---|---|---|
| 1 | $v_{m,C}^2$ | 5 |
| 2 | $v_{m,A}^1$ | 5 |
| 3 | $v_{m,B}^2$ | 4 |
| 4 | $v_{m,C}^3$ | 4 |
| 5 | $v_{m,D}^2$ | 3 |

Figure 20C

| Object | No. of Top Ranked Metrics | Metric | | |
|--------|---------------------------|--------|--|--|
| $O_A$  | 10                        | $v_s$  | | |

| Rank | Correlated metrics | Correlation values | Rating | |
|------|--------------------|--------------------|--------|--|
| 1    | $v_{m,C}^2$        | $\rho(v_s, v_{m,C}^2)$ | ☆☆☆☆☆ | |
| 2    | $v_{m,A}^1$        | $\rho(v_s, v_{m,A}^1)$ | ☆☆☆☆☆ | |
| 3    | $v_{m,B}^2$        | $\rho(v_s, v_{m,B}^2)$ | ☆☆☆☆☆ | |
| 4    | $v_{m,C}^3$        | $\rho(v_s, v_{m,C}^3)$ | ☆☆☆☆☆ | |
| 5    | $v_{m,D}^4$        | $\rho(v_s, v_{m,D}^4)$ | ☆☆☆☆☆ | |
| 6    | $v_{m,D}^3$        | $\rho(v_s, v_{m,D}^3)$ | ☆☆☆☆☆ | |
| 7    | $v_{m,A}^5$        | $\rho(v_s, v_{m,A}^5)$ | ☆☆☆☆☆ | |
| 8    | $v_{m,F}^3$        | $\rho(v_s, v_{m,F}^3)$ | ☆☆☆☆☆ | |
| 9    | $v_{m,C}^4$        | $\rho(v_s, v_{m,C}^4)$ | ☆☆☆☆☆ | |
| 10   | $v_{m,G}^1$        | $\rho(v_s, v_{m,G}^1)$ | ☆☆☆☆☆ | |

Save

Figure 20D

| $(v_s, v_{m,A}^1)$ | $(v_s, v_{m,A}^2)$ | $(v_s, v_{m,B}^2)$ | $(v_s, v_{m,B}^4)$ | $(v_s, v_{m,C}^2)$ | $(v_s, v_{m,C}^3)$ | $(v_s, v_{m,D}^2)$ | $(v_s, v_{m,D}^3)$ | $(v_s, v_{m,D}^4)$ | $(v_s, v_{m,A}^5)$ | Problem | Remedial measure |
|---|---|---|---|---|---|---|---|---|---|---|---|
|   | X | X |   | X |   | X |   | X |   | Problem (1) | Measure (1) |
| X |   | X | X |   | X |   | X |   |   | Problem (2) | Measure (2) |
|   | X | X |   | X | X | X |   | X | X | Problem (3) | Measure (3) |
| X |   |   |   |   |   |   | X |   |   | Problem (4) | Measure (4) |

Figure 21

METHODS AND SYSTEMS FOR TROUBLESHOOTING ANOMALOUS BEHAVIOR IN A DATA CENTER

TECHNICAL FIELD

This disclosure is directed to data centers and, in particular, to troubleshooting anomalous behavior in a data center from streams of metric data.

BACKGROUND

Electronic computing has evolved from primitive, vacuum-tube-based computer systems, initially developed during the 1940s, to modern electronic computing systems in which large numbers of multi-processor computer systems, such as server computers, work stations, and other individual computing systems are networked together with large-capacity data-storage devices and other electronic devices to produce geographically distributed computing systems with hundreds of thousands of components that provide enormous computational bandwidths and data-storage capacities. These large, distributed computing systems are typically housed in data centers and made possible by advances in computer networking, distributed operating systems and applications, data-storage appliances, computer hardware, and software technologies.

In recent years, data centers have grown meet the increasing demand for information technology ("IT") services, such as running applications for organizations that provide business and web services to millions of customers. In order to proactively manage IT systems and services, management tools have been developed to collect metric data and process the metric data to detect performance problems and generate alerts when problems arise. However, typical management tools are not able to troubleshoot the cause of many types of performance problems, which leads to lost revenue for IT service providers when system administrators and application owners are forced to manually troubleshoot performance problems. For example, a typical management tool generates an alert when the response time of a service to a request from a client exceeds a response time threshold. As a result, system administrators are made aware of the problem when the alert is generated. But system administrators may not be able to timely troubleshoot the delayed response time because the cause of the problem may be the result of performance problems occurring with different hardware and software executing in the data center. System administrators and application owners seek methods and systems that troubleshoot problems, giving system administrators and owners an opportunity to timely correct the problems.

SUMMARY

Methods and systems described herein are directed to troubleshooting anomalous behavior in a data center. Anomalous behavior in an object of a data center, such as a computational resource, an application, or a virtual machine ("VM"), may be related to the behavior of other objects at different hierarchies of the data center. Methods and systems described herein use correlation measures to determine whether any metrics associated with the object exhibiting anomalous behavior are correlated with metrics associated with other objects of the data center to detect correlations of the metrics for specific time ranges. Specific combinations of pair-wise correlated metrics may be used to identify problems and apply appropriate remedial measures.

DESCRIPTION OF THE DRAWINGS

FIG. 14A shows a plot of an example metric.

FIG. 17 shows an example table of rank ordered metrics of objects of the object topology.

FIG. 18 shows an example of reducing the list of rank ordered metrics to a list of rank ordered unexpected metrics.

FIG. 20A shows a GUI that list the unexpected metrics, associated correlation coefficients, and user rating icons.

FIG. 20B shows the GUI with a rating assigned to each of the top ten ranked unexpected metrics.

FIG. 20C shows unexpected metrics rank ordered according to the user ratings.

FIG. 20D shows a GUI that list the highest user rated unexpected metrics and recently determined unexpected metrics.

FIG. 21 shows a table of ten frequently occurring unexpected metrics that are correlated with the selected metric.

DETAILED DESCRIPTION

This disclosure presents automated methods and systems for troubleshooting anomalous behavior in a data center. In a first subsection, computer hardware, complex computational systems, and virtualization are described. Methods and systems for troubleshooting anomalous behavior in a data center based on pair-wise correlated streams of metric data are described below in a second subsection.

Computer Hardware, Complex Computational Systems, and Virtualization

The term "abstraction" as used to describe virtualization below is not intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces.

Figure 1:
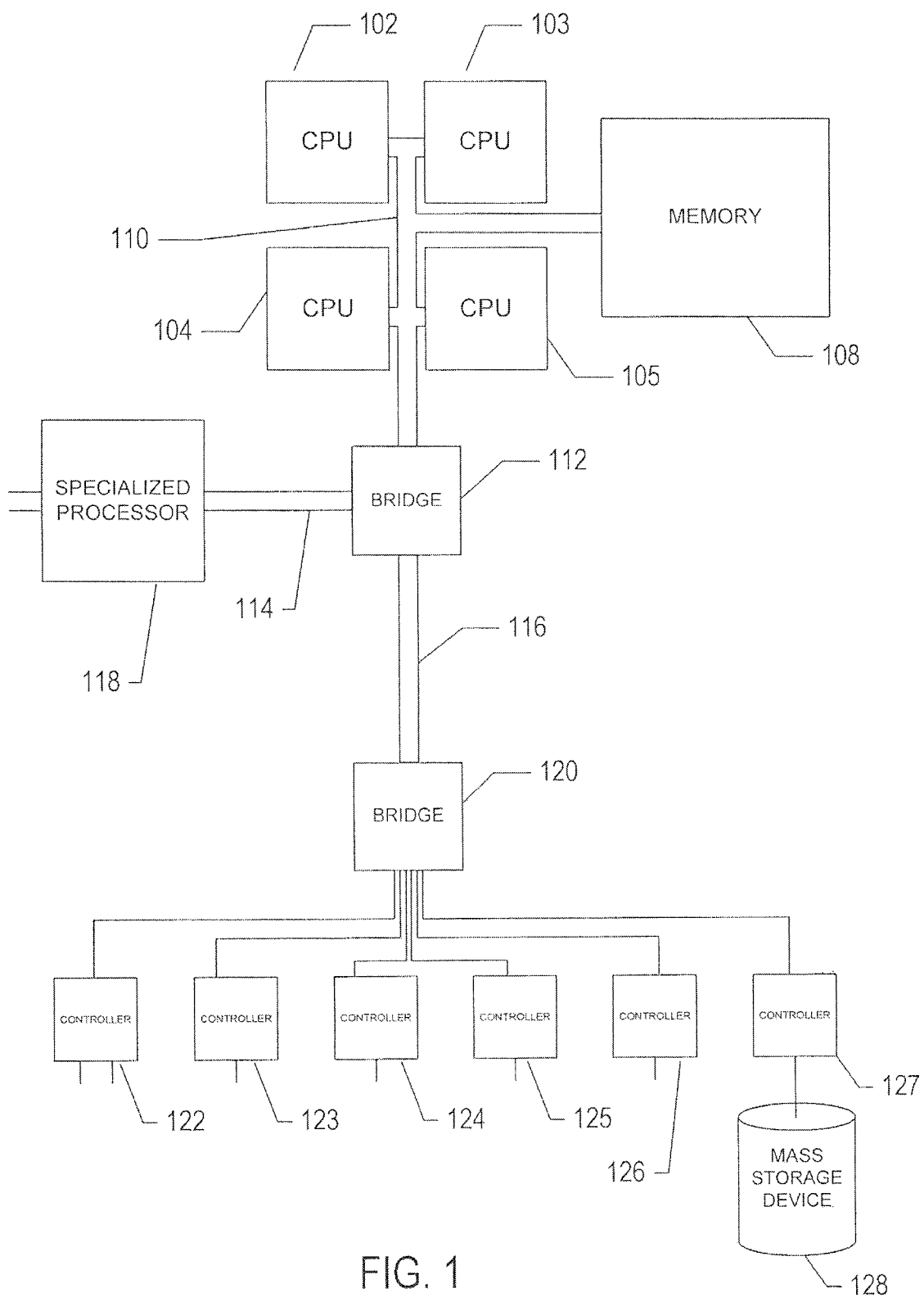
FIG. 1 shows an architectural diagram for various types of computers.

FIG. 1 shows a general architectural diagram for various types of computers. Computers that receive, process, and store log messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of server computers and workstations, and higher-end mainframe computers, but may also include a plethora of various types of special-purpose computing devices, including data-storage systems, communications routers, network nodes, tablet computers, and mobile telephones.

Figure 2:
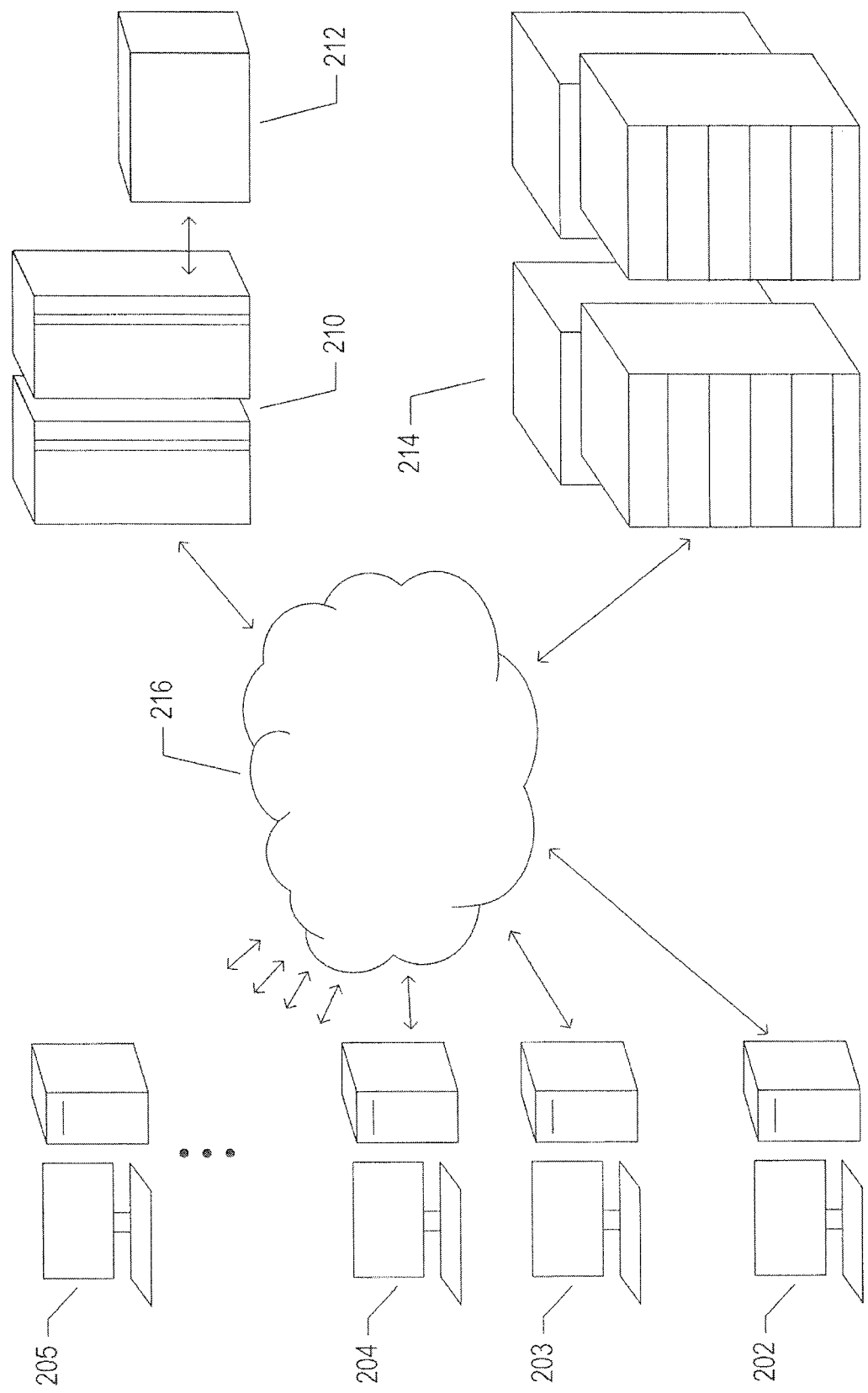
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted server computers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web server computers, back-end computer systems, and data-storage systems for serving web pages to remote customers, receiving orders through the web-page interface, processing the orders, tracking completed orders, and other myriad different tasks associated with an e-commerce enterprise.

Figure 3:
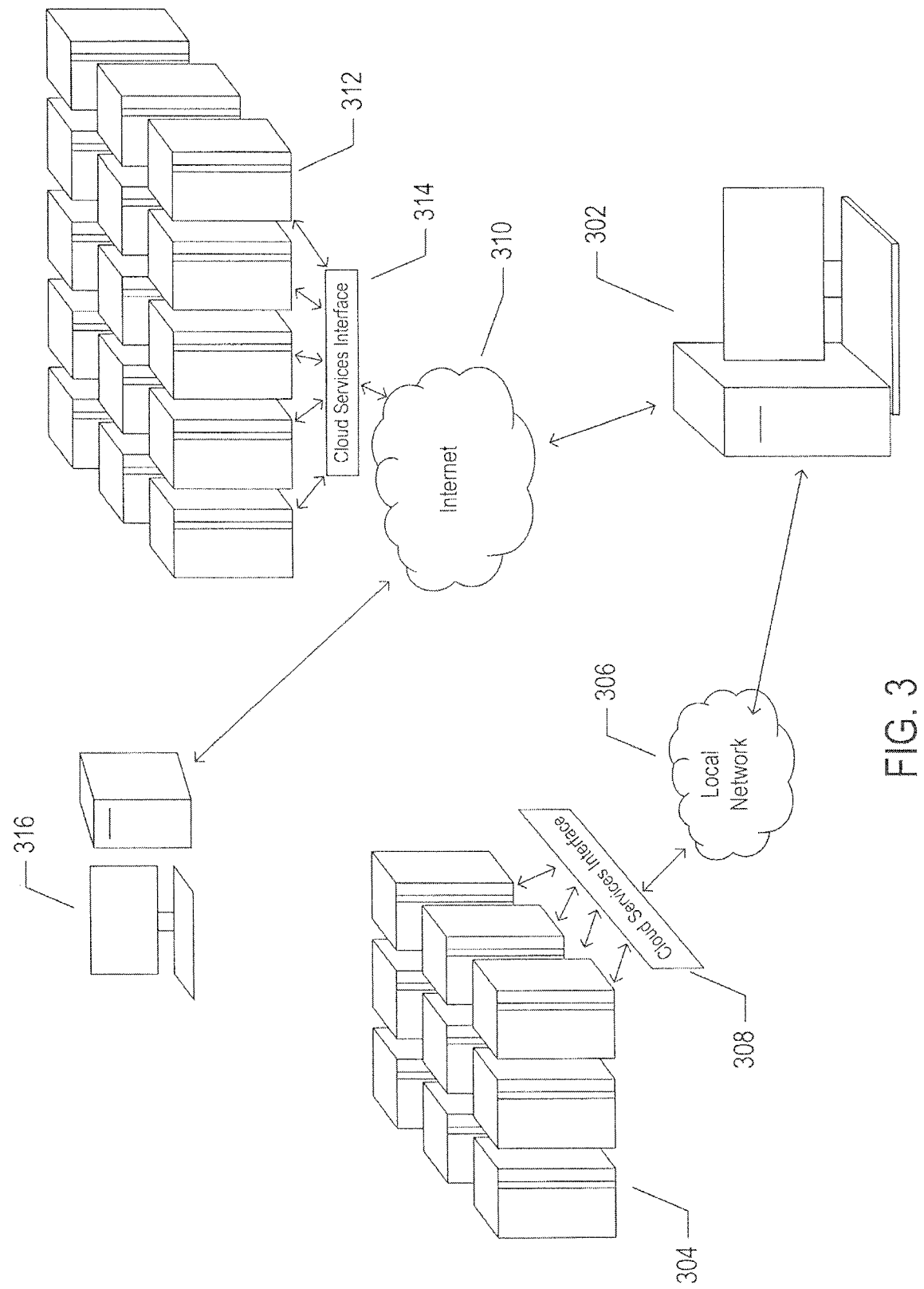
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
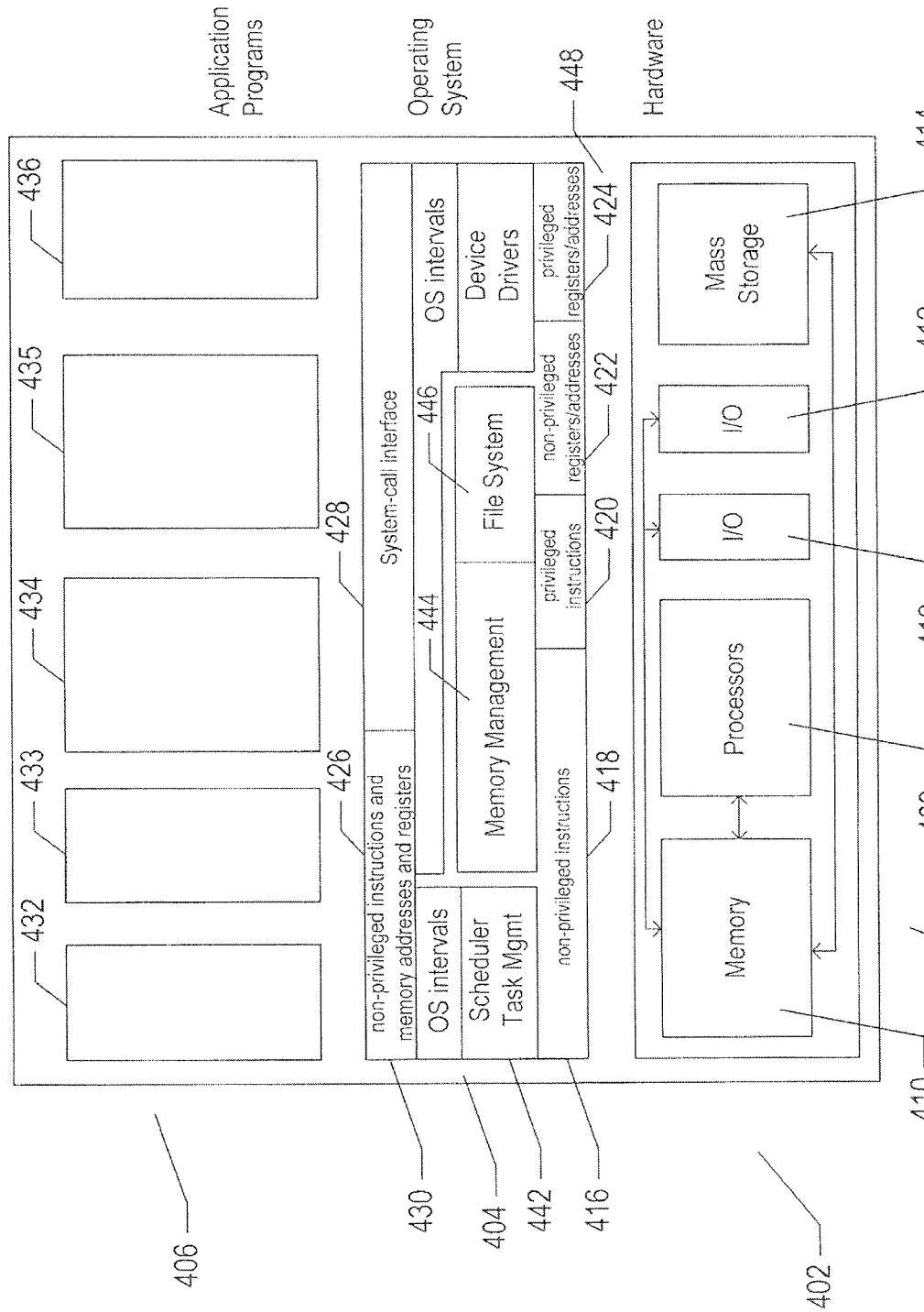
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
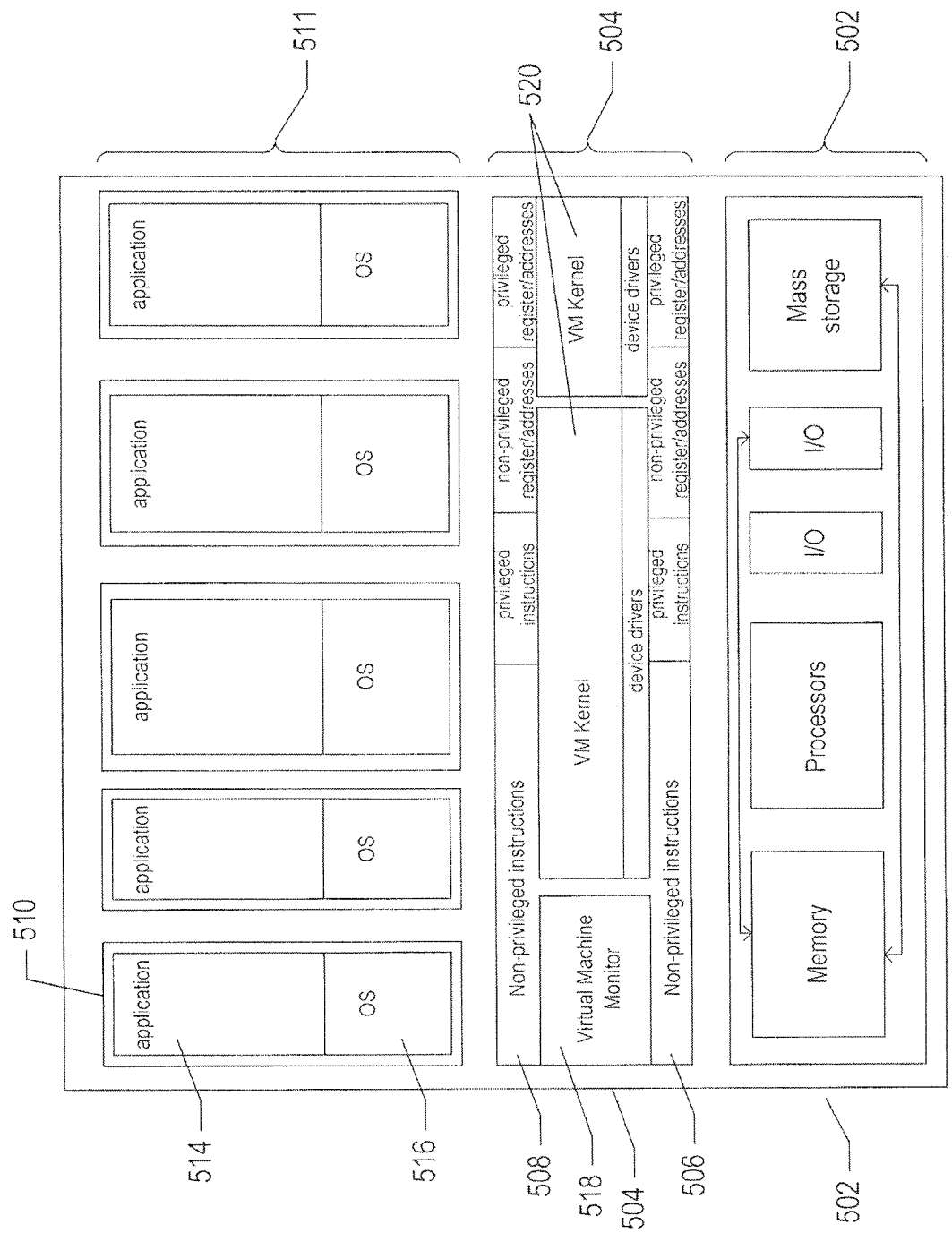
FIGS. 5A-5B show two types of virtual machine ("VM") and VM execution environments.
Figure 5B:
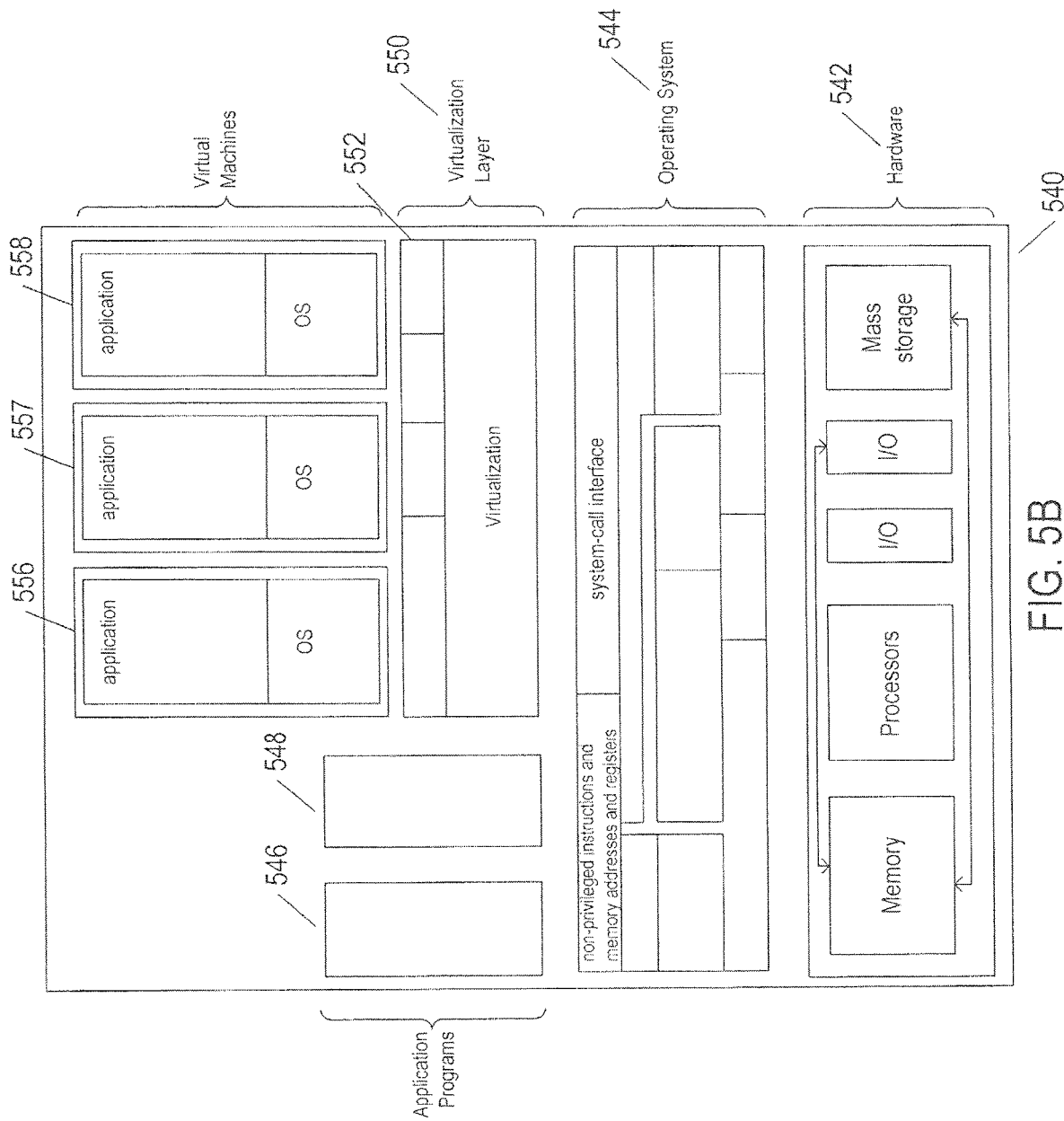

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface to VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization layer interface 504 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization layer 504 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization layer 504, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
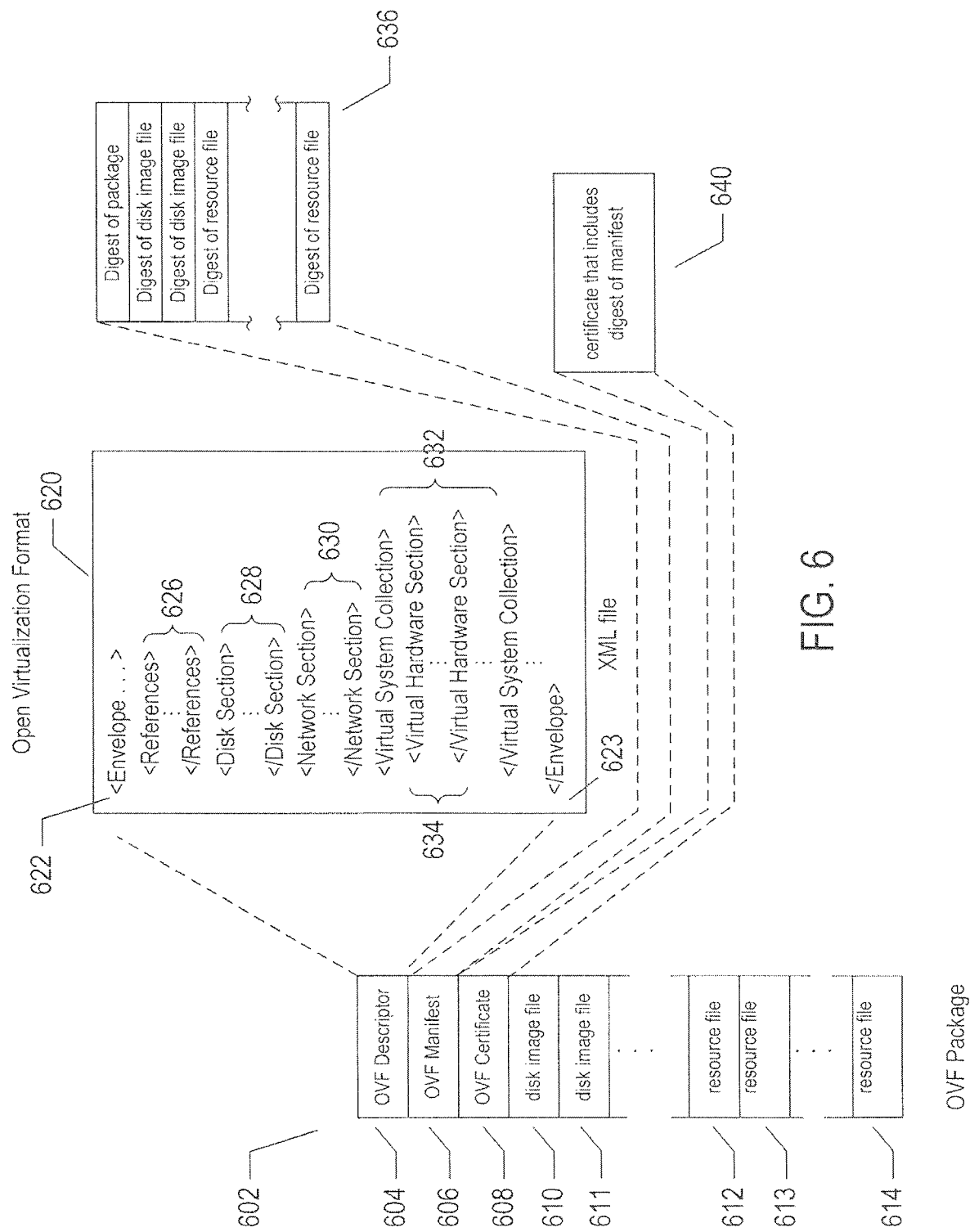
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a network section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
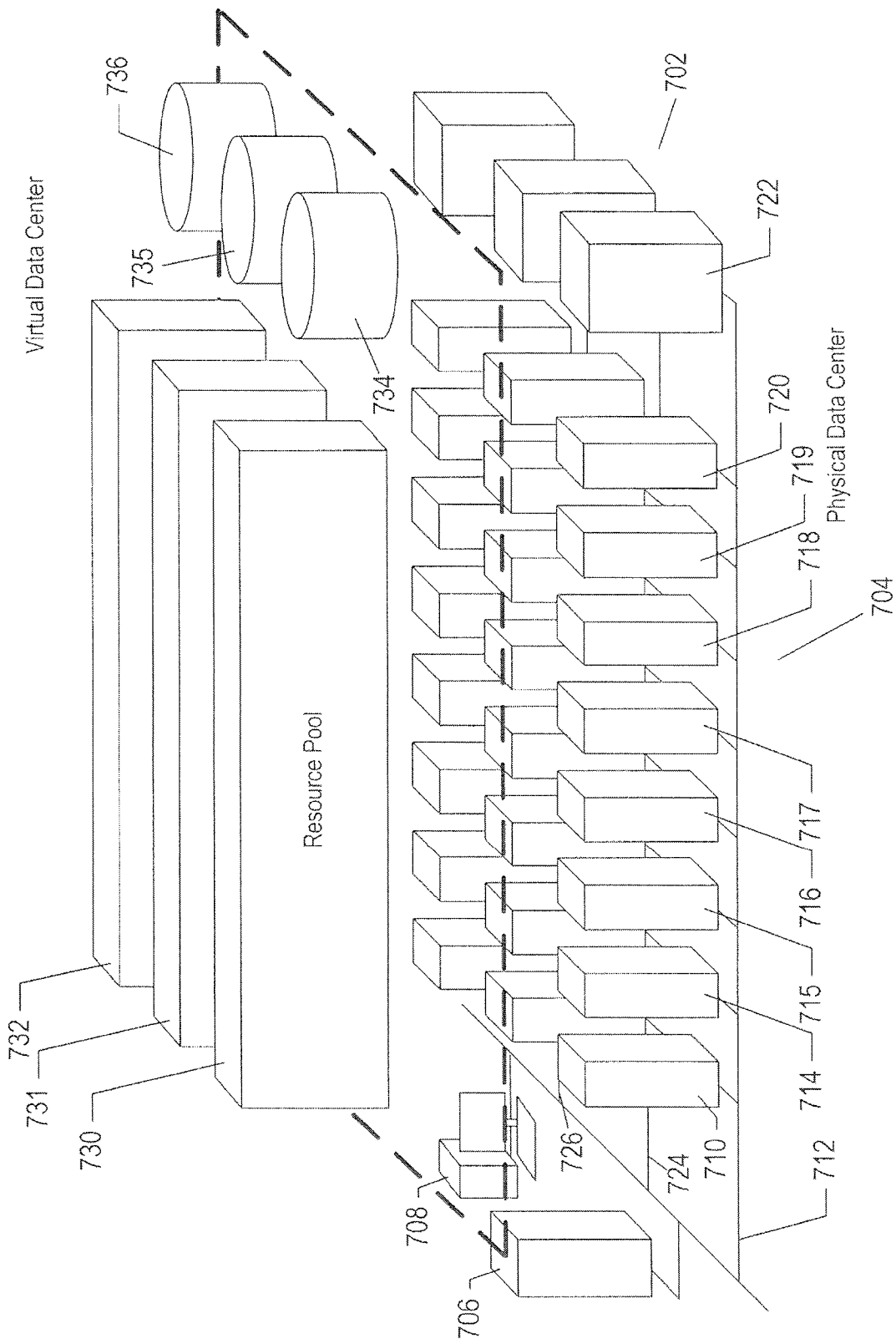
FIG. 7 shows example virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server computer 706 and any of various different computers, such as PC 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight server computers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of server computers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server computer 706 includes functionality to migrate running VMs from one server computer to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual server computers and migrating VMs among server computers to achieve load balancing, fault tolerance, and high availability.

Figure 8:
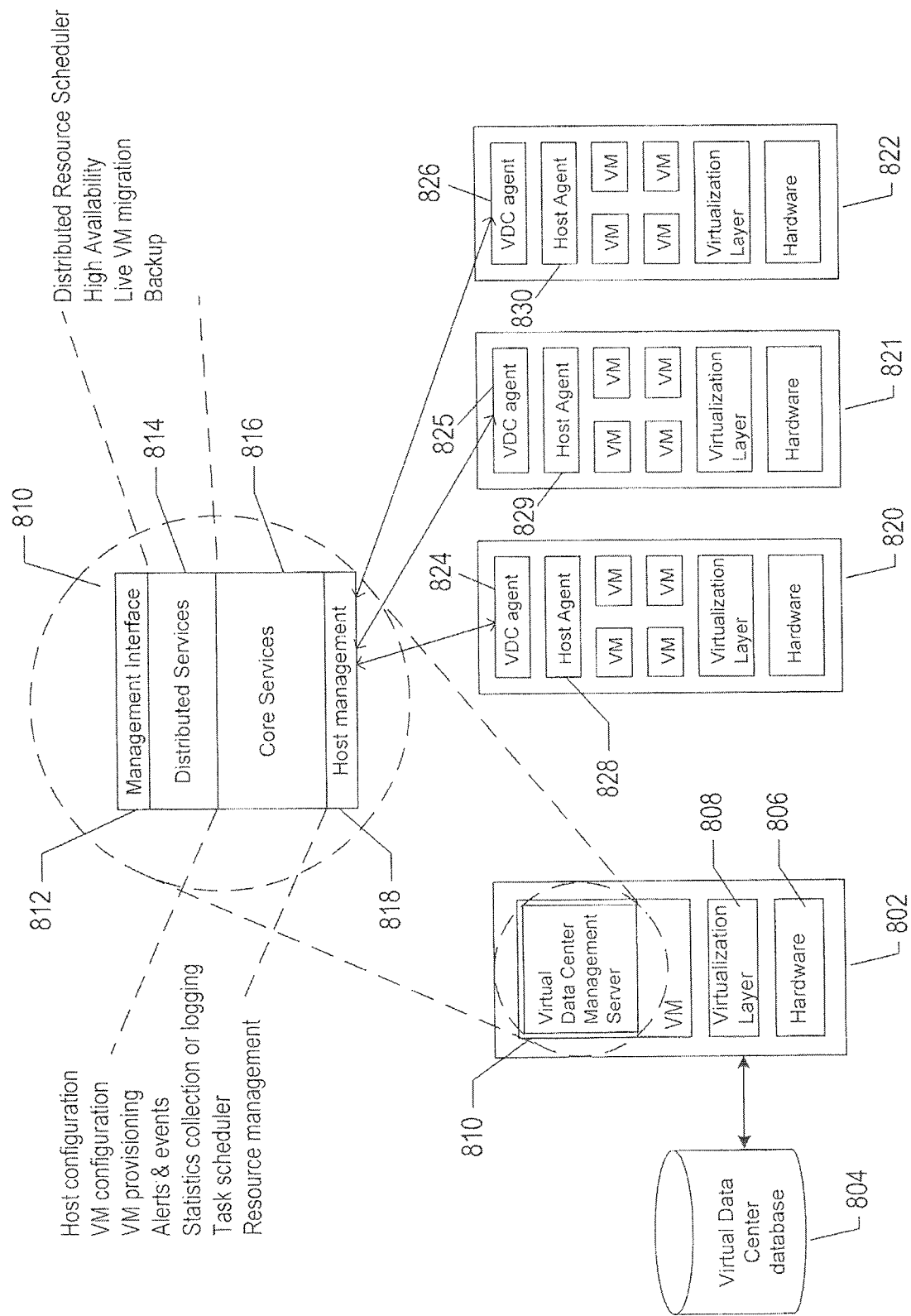
FIG. 8 shows virtual-machine components of a virtual-data-center management server and physical servers of a physical data center.

FIG. 8 shows virtual-machine components of a virtual-data-center management server computer and physical server computers of a physical data center above which a virtual-data-center interface is provided by the virtual-data-center management server computer. The virtual-data-center management server computer 802 and a virtual-data-center database 804 comprise the physical components of the management component of the virtual data center. The virtual-data-center management server computer 802 includes a hardware layer 806 and virtualization layer 808 and runs a virtual-data-center management-server VM 810 above the virtualization layer. Although shown as a single server computer in FIG. 8, the virtual-data-center management server computer ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the server computers of the physical data center that is abstracted to a virtual data center by the VDC management server computer.

The distributed services 814 include a distributed-device scheduler that assigns VMs to execute within particular physical server computers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server computer, and restarts the VM on the different physical server computer from a virtual-machine state recorded when execution of the VM was halted. The distributed services 814 also include a distributed backup service that provides centralized virtual-machine backup and restore.

The core services 816 provided by the VDC management server VM 810 include host configuration, virtual-machine configuration, virtual-machine provisioning, generation of virtual-data-center alerts and events, ongoing event logging and statistics collection, a task scheduler, and a device-management module. Each physical server computers 820-822 also includes a host-agent VM 828-830 through which the virtualization layer can be accessed via a virtual-infrastructure application programming interface ("API"). This interface allows a remote administrator or user to manage an individual server computer through the infrastructure API. The virtual-data-center agents 824-826 access virtualization-layer server information through the host agents. The virtual-data-center agents are primarily responsible for off-loading certain of the virtual-data-center management-server functions specific to a particular physical server to that physical server computer. The virtual-data-center agents relay and enforce device allocations made by the VDC management server VM 810, relay virtual-machine provisioning and configuration-change commands to host agents, monitor and collect performance statistics, alerts, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to an individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
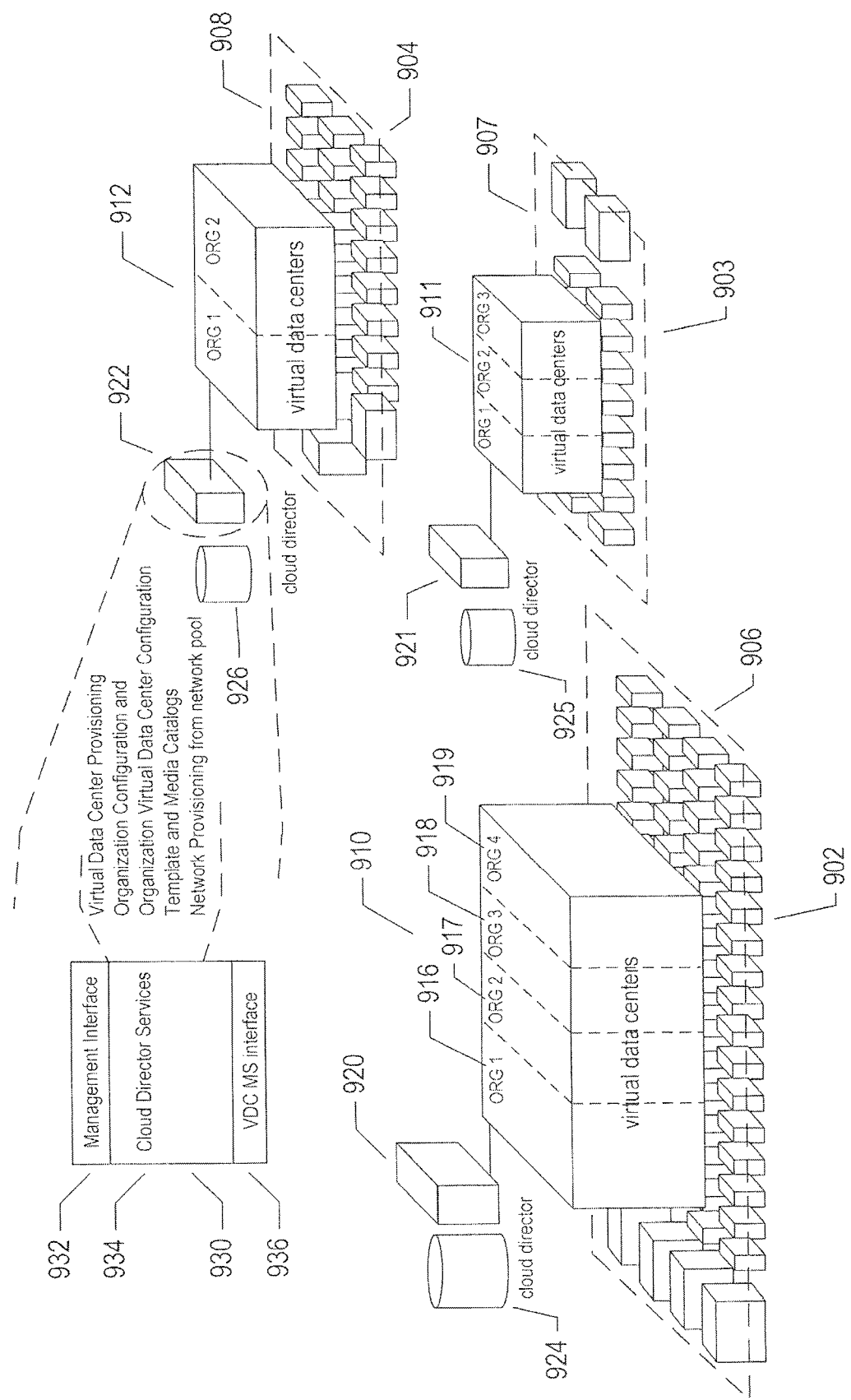
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director server computers 920-922 and associated cloud-director databases 924-926. Each cloud-director server computer or server computers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
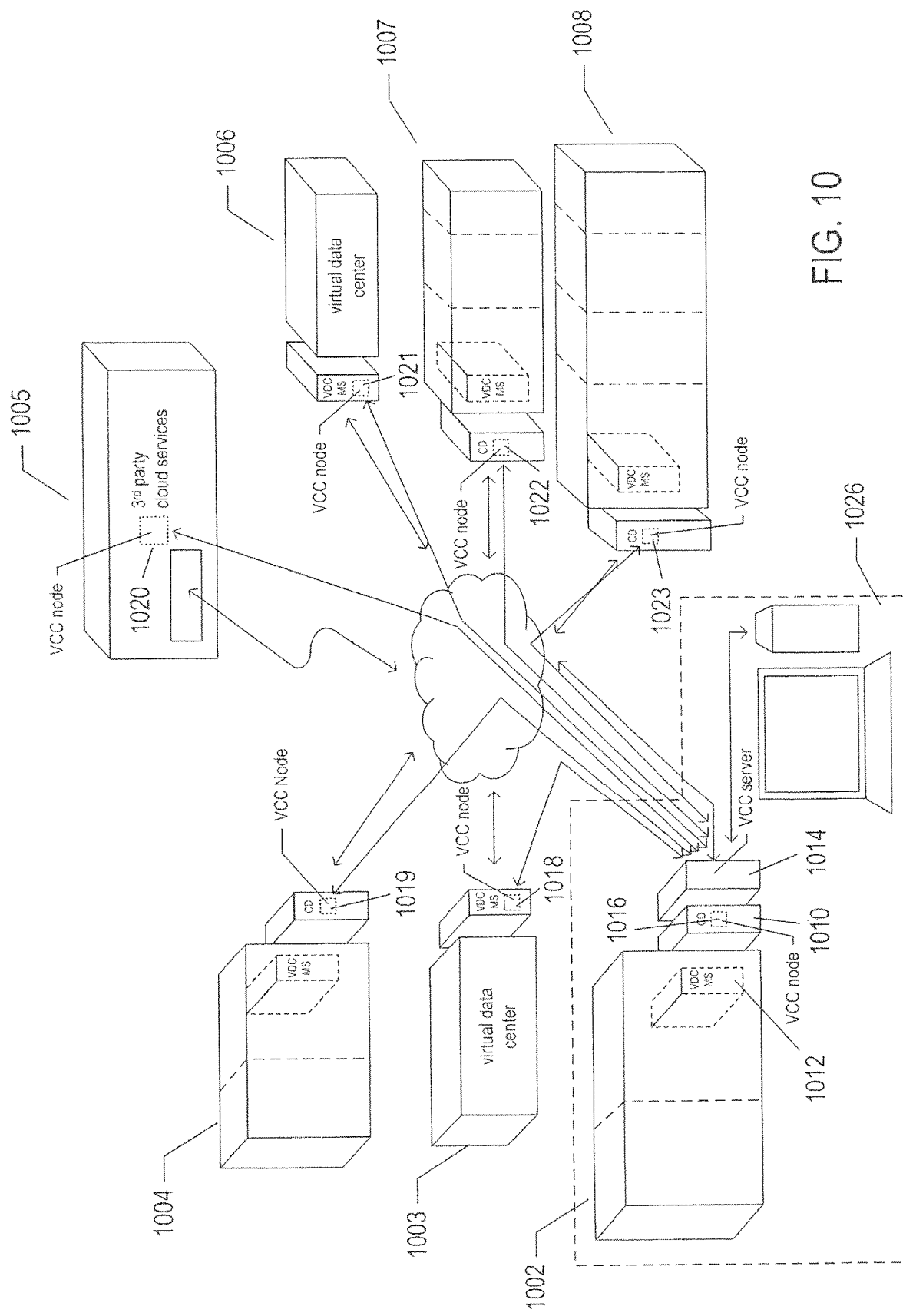
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCCserver-provided aggregate-cloud distributed services. In general, the cloud-computing facilities that together form a multiple-cloud-computing aggregation through distributed services provided by the VCC server and VCC nodes are geographically and operationally distinct.

As mentioned above, while the virtual-machine-based virtualization layers, described in the previous subsection, have received widespread adoption and use in a variety of different environments, from personal computers to enormous distributed computing systems, traditional virtualization technologies are associated with computational overheads. While these computational overheads have steadily decreased, over the years, and often represent ten percent or less of the total computational bandwidth consumed by an application running above a guest operating system in a virtualized environment, traditional virtualization technologies nonetheless involve computational costs in return for the power and flexibility that they provide.

While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system of the host. In essence, OSL virtualization uses operating-system features, such as namespace isolation, to isolate each container from the other containers running on the same host. In other words, namespace isolation ensures that each application is executed within the execution environment provided by a container to be isolated from applications executing within the execution environments provided by the other containers. A container cannot access files that are not included in the container's namespace and cannot interact with applications running in other containers. As a result, a container can be booted up much faster than a VM, because the container uses operating-system-kernel features that are already available and functioning within the host. Furthermore, the containers share computational bandwidth, memory, network bandwidth, and other computational resources provided by the operating system, without the overhead associated with computational resources allocated to VMs and virtualization layers. Again, however, OSL virtualization does not provide many desirable features of traditional virtualization. As mentioned above, OSL virtualization does not provide a way to run different types of operating systems for different groups of containers within the same host and OSL-virtualization does not provide for live migration of containers between hosts, high-availability functionality, distributed resource scheduling, and other computational functionality provided by traditional virtualization technologies.

Figure 11:
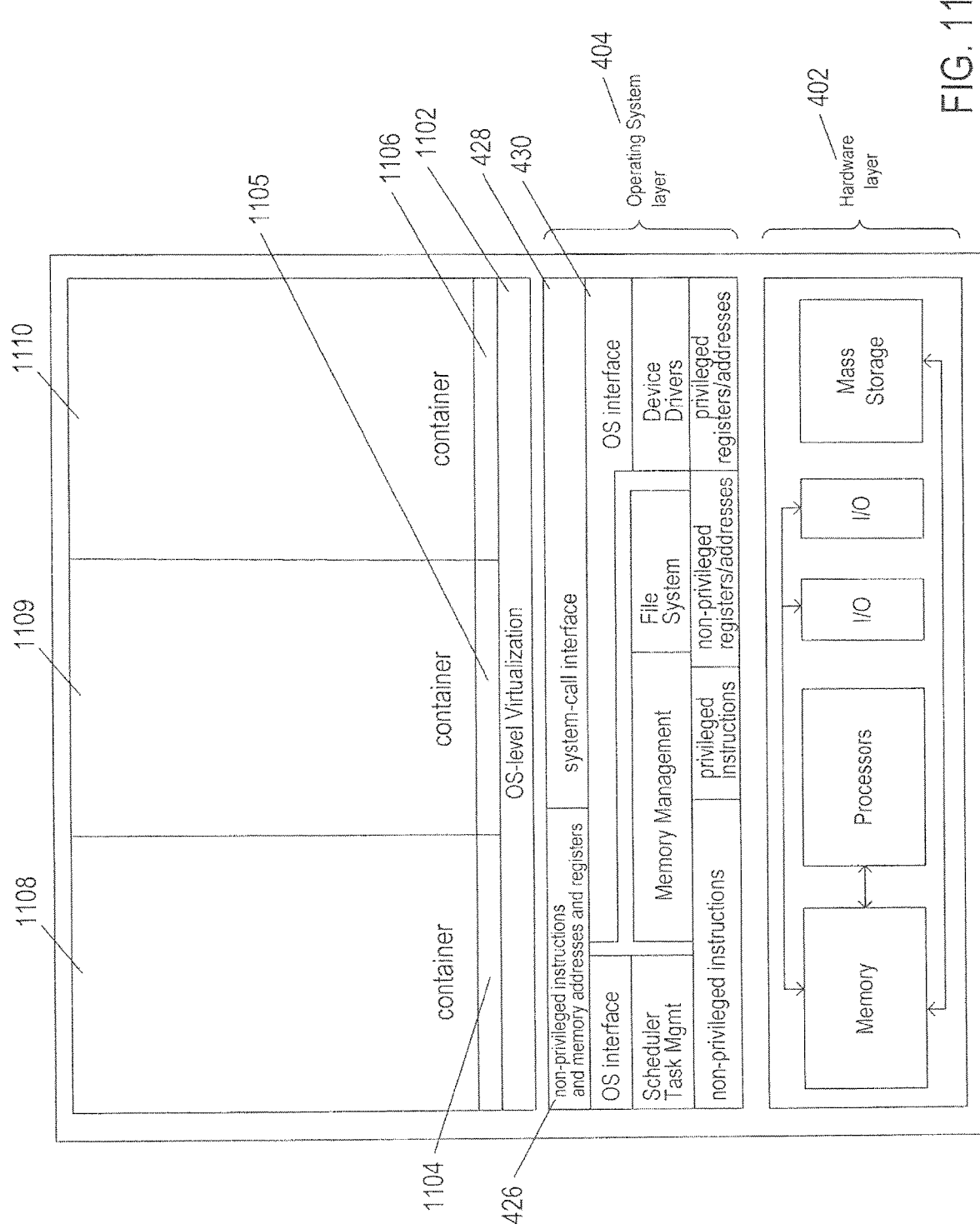
FIG. 11 shows an example server computer used to host three containers.

FIG. 11 shows an example server computer used to host three containers. As discussed above with reference to FIG. 4, an operating system layer 404 runs above the hardware 402 of the host computer. The operating system provides an interface, for higher-level computational entities, that includes a system-call interface 428 and the non-privileged instructions, memory addresses, and registers 426 provided by the hardware layer 402. However, unlike in FIG. 4, in which applications run directly above the operating system layer 404, OSL virtualization involves an OSL virtualization layer 1102 that provides operating-system interfaces 1104-1106 to each of the containers 1108-1110. The containers, in turn, provide an execution environment for an application that runs within the execution environment provided by container 1108. The container can be thought of as a partition of the resources generally available to higher-level computational entities through the operating system interface 430.

Figure 12:
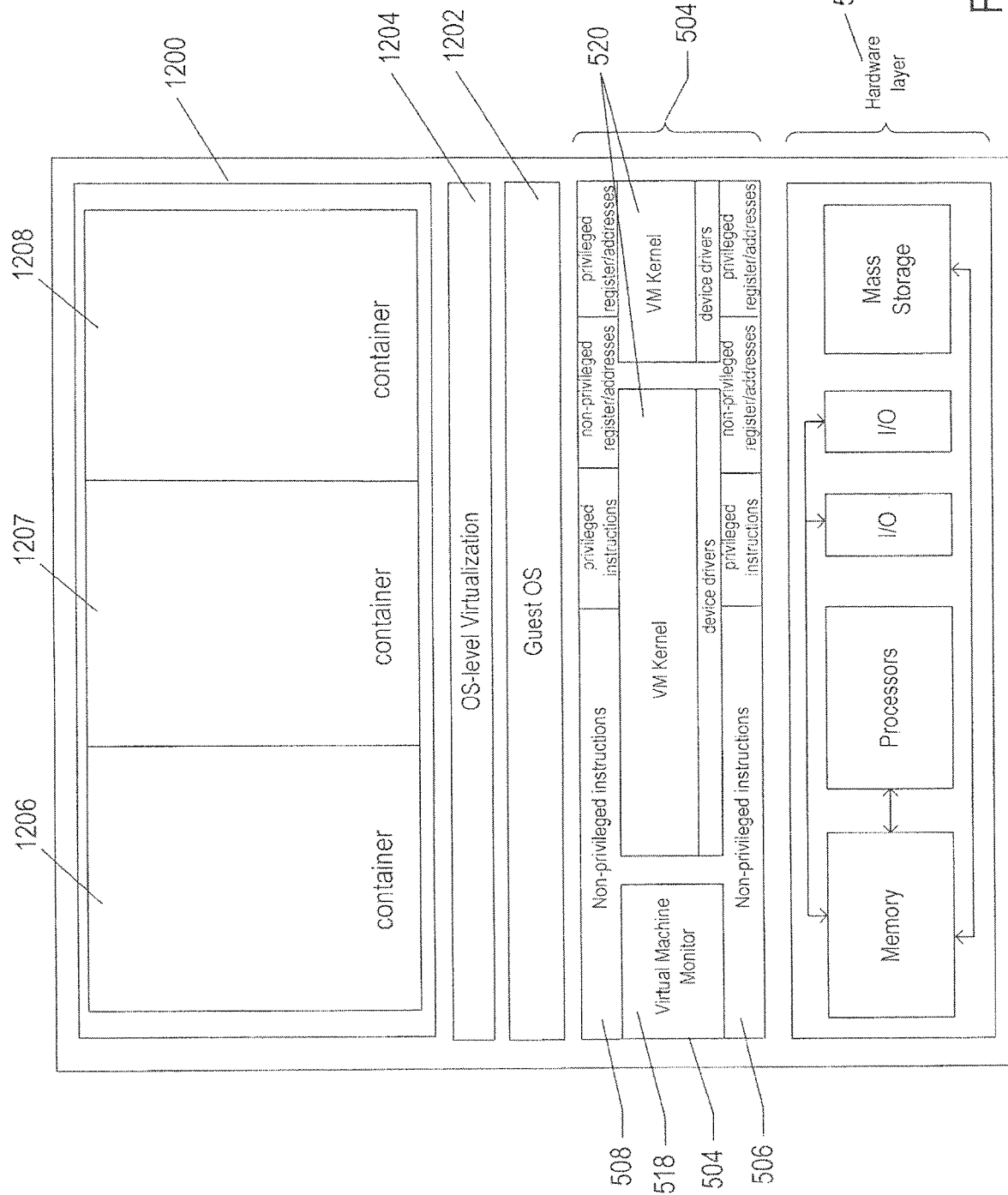
FIG. 12 shows an approach to implementing containers on a VM.

FIG. 12 shows an approach to implementing the containers on a VM. FIG. 12 shows a host computer similar to that shown in FIG. 5A, discussed above. The host computer includes a hardware layer 502 and a virtualization layer 504 that provides a virtual hardware interface 508 to a guest operating system 1102. Unlike in FIG. 5A, the guest operating system interfaces to an OSL-virtualization layer 1104 that provides container execution environments 1206-1208 to multiple application programs.

Note that, although only a single guest operating system and OSL virtualization layer are shown in FIG. 12, a single virtualized host system can run multiple different guest operating systems within multiple VMs, each of which supports one or more OSL-virtualization containers. A virtualized, distributed computing system that uses guest operating systems running within VMs to support OSL-virtualization layers to provide containers for running applications is referred to, in the following discussion, as a "hybrid virtualized distributed computing system."

Running containers above a guest operating system within a VM provides advantages of traditional virtualization in addition to the advantages of OSL virtualization. Containers can be quickly booted in order to provide additional execution environments and associated resources for additional application instances. The resources available to the guest operating system are efficiently partitioned among the containers provided by the OSL-virtualization layer 1204 in FIG. 12, because there is almost no additional computational overhead associated with container-based partitioning of computational resources. However, many of the powerful and flexible features of the traditional virtualization technology can be applied to VMs in which containers run above guest operating systems, including live migration from one host to another, various types of high-availability and distributed resource scheduling, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides for flexible and scaling over large numbers of hosts within large distributed computing systems and a simple approach to operating-system upgrades and patches. Thus, the use of OSL virtualization above traditional virtualization in a hybrid virtualized distributed computing system, as shown in FIG. 12, provides many of the advantages of both a traditional virtualization layer and the advantages of OSL virtualization.

Figure 13:
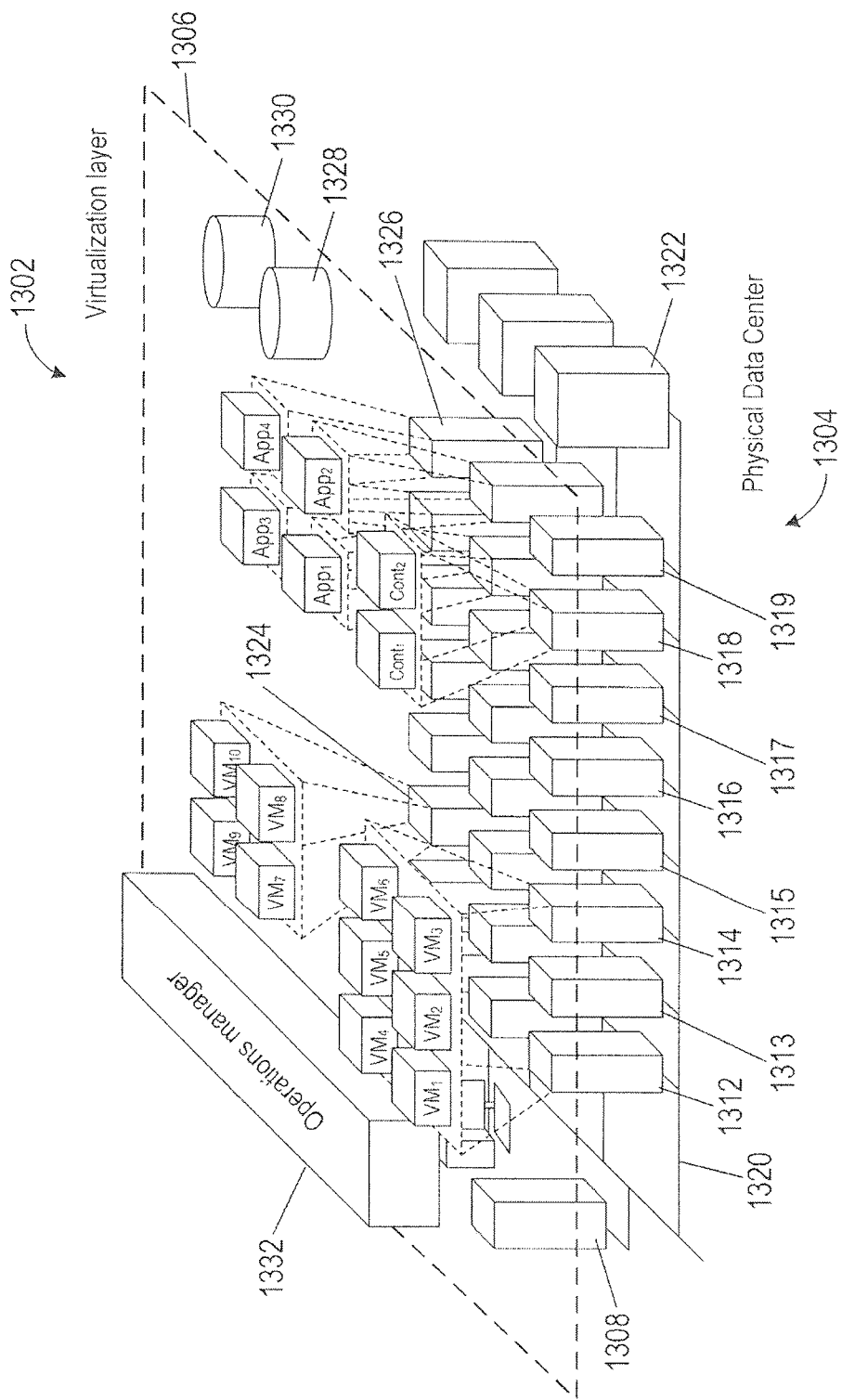
FIG. 13 shows an example of a virtualization layer located above a physical data center.

Methods and Systems for Troubleshooting Anomalous Behavior in a Data Center Based on Pair-Wise Streams of Metric Data FIG. 13 shows an example of a virtualization layer 1302 located above a physical data center 1304. For the sake of illustration, the virtualization layer 1302 is separated from the physical data center 1304 by a virtual-interface plane 1306. The physical data center 1304 is an example of a distributed computing system. The physical data center 1304 comprises physical objects, including an administration computer system 1308, any of various computers, such as PC 1310, on which a virtual-data-center ("VDC") management interface may be displayed to system administrators and other users, server computers, such as server computers 1312-1319, data-storage devices, and network devices. Each server computer may have multiple network interface cards ("NICs") to provide high bandwidth and networking to other server computers and data storage devices. The server computers may be networked together to form server-computer groups within the data center 1304. The example physical data center 1304 includes three server-computer groups each of which have eight server computers. For example, server-computer group 1320 comprises interconnected server computers 1312-1319 that are connected to a mass-storage array 1322. Within each server-computer group, certain server computers are grouped together to form a cluster that provides an aggregate set of resources (i.e., resource pool) to objects in the virtualization layer 1302. Different physical data centers may include many different types of computers, networks, data-storage systems and devices connected according to many different types of connection topologies.

The virtualization layer 1302 includes virtual objects, such as VMs, applications, and containers, hosted by the server computers in the physical data center 1304. The virtualization layer 1302 may also include a virtual network (not illustrated) of virtual switches, routers, load balancers, and NICs formed from the physical switches, routers, and NICs of the physical data center 1304. Certain server computers host VMs and containers as described above. For example, server computer 1318 hosts two containers identified as $Cont_1$ and $Cont_2$; cluster of server computers 1312-1314 host six VMs identified as $VM_1$, $VM_2$, $VM_3$, $VM_4$, $VM_5$, and $VM_6$; server computer 1324 hosts four VMs identified as $VM_7$, $VM_8$, $VM_9$, $VM_{10}$. Other server computers may host applications as described above with reference to FIG. 4. For example, server computer 1326 hosts an application identified as $App_4$.

The virtual-interface plane 1306 abstracts the resources of the physical data center 1304 to one or more VDCs comprising the virtual objects and one or more virtual data stores, such as virtual data stores 1328 and 1330. For example, one VDC may comprise the VMs running on server computer 1324 and virtual data store 1328. Automated methods and systems described herein may be executed by an operations manager 1332 in one or more VMs on the administration computer system 1308. The operations manager 1332 provides several interfaces, such as graphical user interfaces, for data center management, system administrators, and application owners. The operations manager 1332 receives streams of metric data from various physical and virtual objects of the data center as described below.

In the following discussion, the term "object" refers to a physical object, such as a server computer and a network device, or to a virtual object, such as an application, VM, virtual network device, container, or any other physical or virtual object of the physical data center 1304 for which metric data can be collected to evaluate abnormal or normal behavior of the object. The term "resource" refers to a physical resource of the data center, such as, but are not limited to, a processor, a core, memory, a network connection, network interface, data-storage device, a mass-storage device, a switch, a router, and other any other component of the physical data center 1304. Resources of a server computer and clusters of server computers may form a resource pool for creating virtual resources of a virtual infrastructure used to run virtual objects. The term "resource" may also refer to a virtual resource, which may have been formed from physical resources assigned to a virtual object. For example, a resource may be a virtual processor used by a virtual object formed from one or more cores of a multicore processor, virtual memory formed from a portion of physical memory and a hard drive, virtual storage formed from a sector or image of a hard disk drive, a virtual switch, and a virtual router. Each virtual object uses only the physical resources assigned to the virtual object.

The operations manager 1332 monitors physical and virtual resources for anomalous behavior by collecting numerous streams of time-dependent metric data. Each stream of metric data is time series data that may be generated by an operating system, a resource, or by an object itself. A stream of metric data associated with a resource comprises a sequence of time-ordered metric values that are recorded in spaced points in time called "time stamps." A stream of metric data is simply called a "metric" and is denoted by $$v(t)=(x_i)_{i=1}^N=(x(t_i))_{i=1}^N \qquad (1)$$

where
v denotes the name of the metric;
N is the number of metric values in the sequence;
$x_i=x(t_i)$ is a metric value;
$t_i$ is a time stamp indicating when the metric value was recorded in a data-storage device; and
subscript i is a time stamp index i=1, ..., N.

FIG. 14A shows a plot of an example metric. Horizontal axis 1402 represents time. Vertical axis 1404 represents a range of metric value amplitudes. Curve 1406 represents a metric as time series data. In practice, a metric comprises a sequence of discrete metric values in which each metric value is recorded in a data-storage device. FIG. 14A includes a magnified view 1408 of three consecutive metric values represented by points. Each point represents an amplitude of the metric at a corresponding time stamp. For example, points 1410-1412 represent consecutive metric values (i.e., amplitudes) $x_{i-1}$, $x_i$, and $x_{i+1}$ recorded in a data-storage device at corresponding time stamps $t_{i-1}$, $t_i$, and $t_{i+1}$. The example metric may represent usage of a physical or virtual resource. For example, the metric may represent CPU usage of a core in a multicore processor of a server computer over time. The metric may represent the amount of virtual memory a VM uses over time. The metric may represent network throughput for a server computer. Network throughput is the number of bits of data transmitted to and from a physical or virtual object and is recorded in megabits, kilobits, or bits per second. The metric may represent network traffic for a server computer. Network traffic at a physical or virtual object is a count of the number of data packets received and sent per unit of time. The metric may also represent object performance, such as CPU contention, response time to requests, and wait time for access to a resource of an object.

Each object may have numerous associated metrics. A server computer may have hundreds of associated metrics including usage of each core of a multicore core processor, memory usage, storage usage, network throughput, error rates, datastores, disk usage, average response times, peak response times, thread counts, and power usage just to name a few. A virtual object, such as a VM, may have hundreds of associated metrics that monitor both physical and virtual resource usage, such as virtual CPU metrics, virtual memory usage metrics, virtual disk usage, virtual storage space, number of data stores, average and peak response times for various physical and virtual resources of the VM, network throughput, and power usage just to name a few.

Figure 14B:
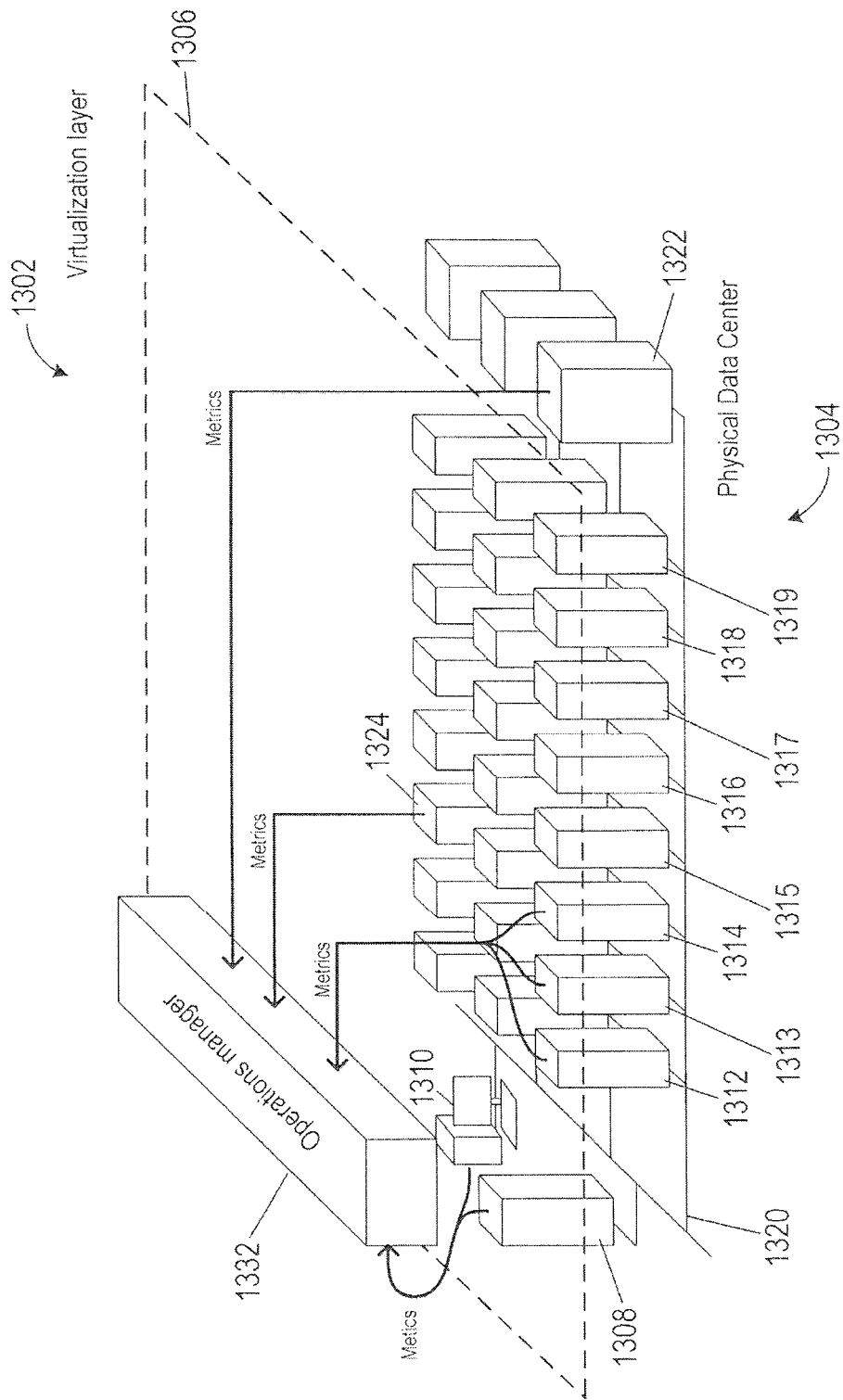
FIGS. 14B-14C shows an operations manager that receives metrics from physical and virtual resources.
Figure 14C:
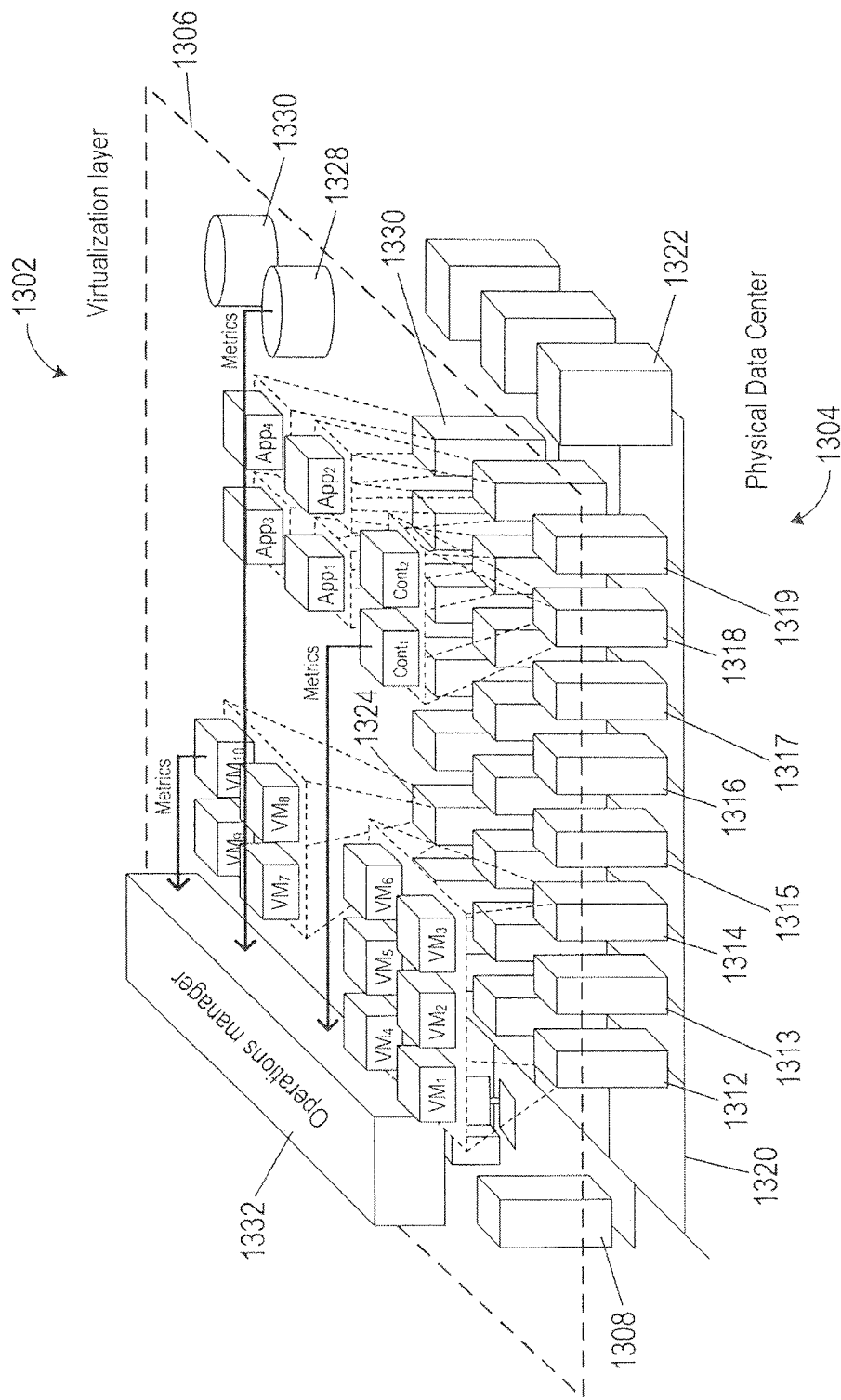

In FIGS. 14B-14C, the operations manager 1332 receives numerous metrics associated with numerous resources and objects. Directional arrows represent metrics sent from physical and virtual resources to the operations manager 1332. In FIG. 14B, the operating systems of PC 1310, server computers 1308 and 1324, and mass-storage array 1322 send metrics to the operations manager 1332. A cluster of server computers 1312-1314 send metrics to the operations manager 1332. In FIG. 14C, the operating systems, VMs, containers, applications, and virtual storage may independently send metrics to the operations manager 1332. Certain objects may send metrics as the time series data is generated while other objects may only send time series data of a metric at certain times or when requested to send metrics by the operations manager 1332. The operations manager 1332 may be implemented in a VM to collect and processes the metrics to identify abnormal behaving objects and may generate recommendations to correct abnormally behaving objects or execute remedial measures, such as reconfiguring a virtual network of a VDC or migrating VMs from one server computer to another. For example, remedial measures may include, but are not limited to, powering down server computers, replacing VMs disabled by physical hardware problems and failures, spinning up cloned VMs on additional server computers to ensure that the services provided by the VMs are accessible to increasing demand or when one of the VMs becomes compute or data-access bound.

Unexpected abnormal behavior in an object of a data center may be the result of abnormal behavior exhibited by another object at different levels of an object topology of a data center. Alternatively, abnormal behavior in an object of a data center may create unexpected abnormal behavior exhibited by other objects located in different levels of the object topology. These unexpected abnormal behaviors may be exhibited in correlations of the associated metrics for specific time intervals.

An object topology of objects of a data center is determined by parent/child relationships between the objects comprising the set. For example, a server computer is a parent with respect VMs (i.e., children) executing on the host, and, at the same time, the server computer is a child with respect to a cluster (i.e., parent). The object topology may be represented as a graph of objects. The object topology for a set of objects may be dynamically created by the operations manager 1332 subject to continuous updates to VMs and server computers and other changes to the data center.

Figure 15A:
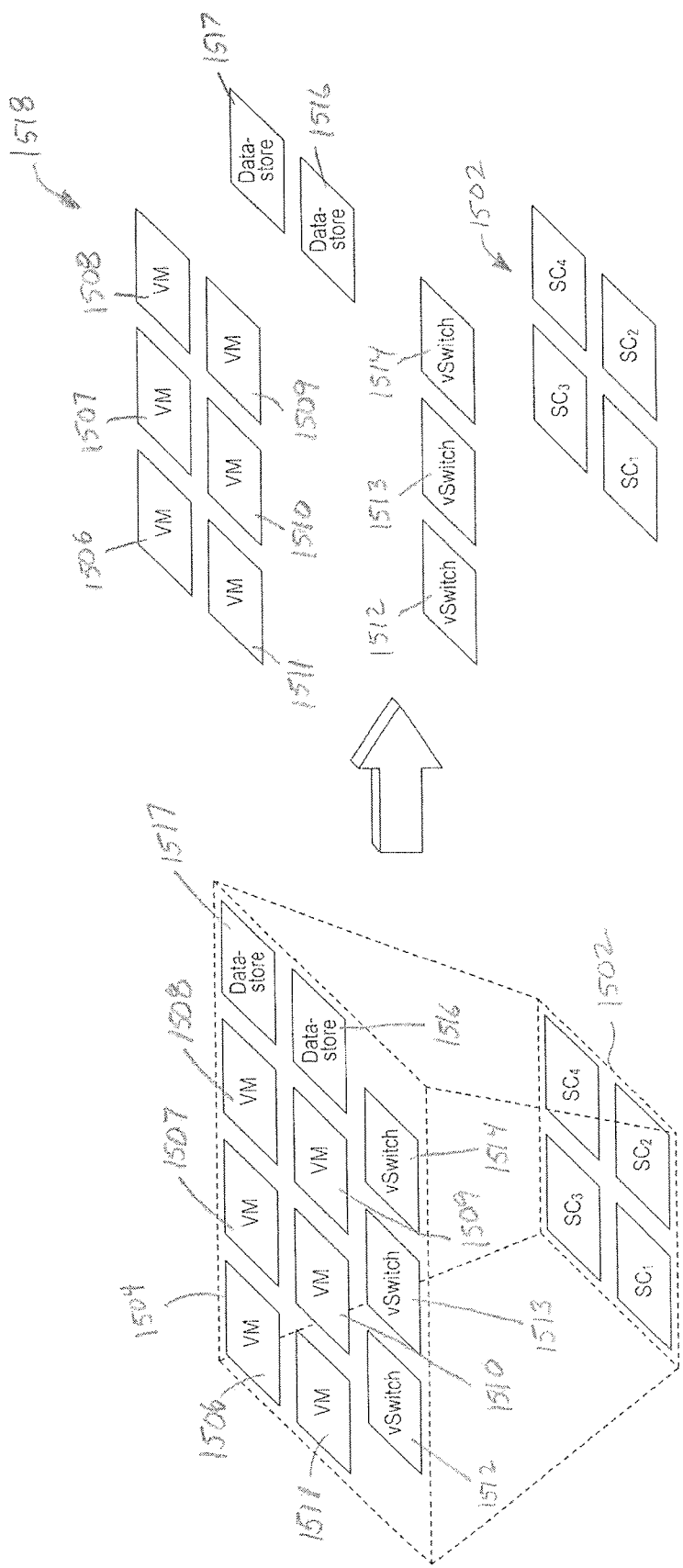
FIG. 15A shows an example object topology formed from objects of a cluster in a data center.
Figure 15B:
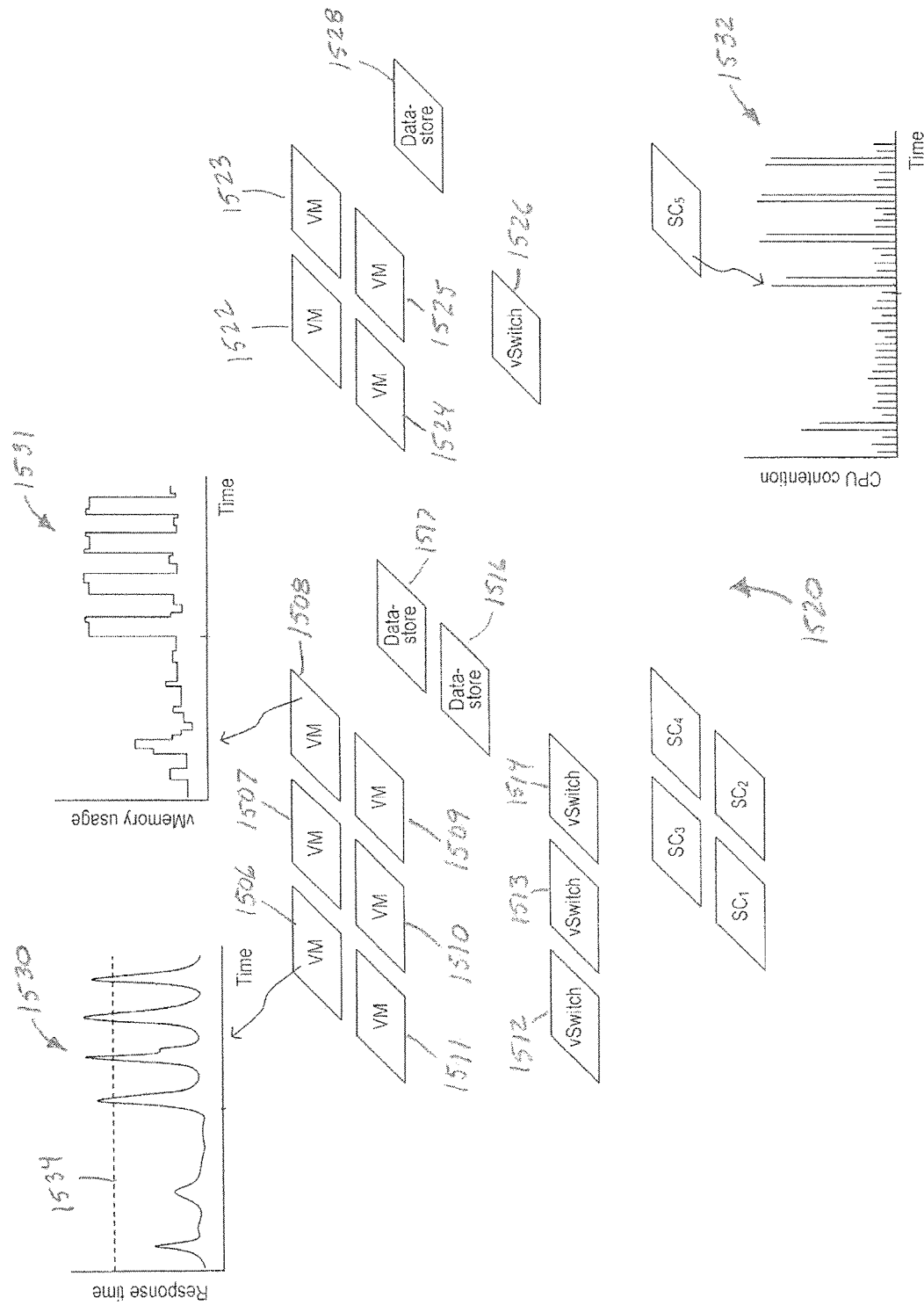
FIG. 15B shows example plots of metrics associated with two VMs and a server computer of the cluster shown in FIG. 15A.

FIG. 15A shows an example object topology of a cluster in a data center. In this example, a cluster 1502 comprises four server computers, identified as $SC_1$, $SC_2$, $SC_3$, and $SC_4$, that are networked together to provide computational and network resources for virtual objects in a virtualization level 1504. The physical resources of the cluster 1502 are aggregated to create virtual resources for the virtual objects in the virtualization layer 1504. The virtual objects include six VMs 1506-1511, three virtual switches 1512-1514, and two datastores 1516-1517. In FIG. 15A, an example object topology 1518 comprises four levels. A first level of objects comprises the VMs 1506-1511 that share the same resources of the cluster 1502. A second level of objects comprises the virtual switches 1512-1514 of a virtual network that connects the VMs 1506-1511 to each other. A third level comprises the datastores 1516 and 1517 that store the virtual hard disks of the VMs 1506-1511. A fourth level comprises the server computers $SC_1$, $SC_2$, $SC_3$, and $SC_4$. In other implementations, the object topology may be further divided based on whether the objects are related. For example, the first level of VMs may be divided into two levels if VMs 1506-1509 comprise modules of a first distributed application and VMs 1510 and 1511 comprise modules of a second distributed application. An object topology may include objects of multiple server computers in a data center. FIG. 15B shows an example object topology 1520 formed from the object topology of objects 1518 in FIG. 15A expanded to include objects of a server computer identified as $SC_5$. Virtual objects of the server computer $SC_5$ include four VMs 1522-1525, a virtual switch 1526, and a datastore 1528.

FIG. 15B also shows three example plots 1530-1532 of metrics associated with VM 1506, VM 1508, and server computer $SC_5$. Plot 1530 shows a plot of response time for the application executing in VM 1506. Plot 1531 shows a plot of virtual memory of the VM 1508. Plot 1532 shows a plot of CPU contention for cores of a multicore processor of the server computer $SC_5$. The plots 1530-1532 reveal that before time, t, response time of the application executing in the VM 1506, virtual memory of the VM 1508, and CPU contention at the server computer $SC_5$ are uncorrelated. After time t the response time of the application executing in the VM 1506, virtual memory of the VM 1509, and CPU contention at the server computer $SC_5$ appear correlated with peaks and troughs occurring at about the same times.

Methods and systems described herein compute correlations between metrics of an object exhibiting unexpected abnormal behavior and other metrics of objects in different levels of an object topology of a data center. The object topology contains the object exhibiting unexpected abnormal behavior. The combination of correlations may be used to identify a type of problem in the data center. For example, in FIG. 15B, suppose VMs 1506 and 1508 use services provided by the VMs 1522-1525 executing on the server computer $SC_5$. When the services provided by the VMs 1522-1525 are interrupted or perturbed, VM 1506 experiences a response time delay revealed by plot 1530 and VM 1508 experiences spikes in memory usage revealed by plot 1531. A system administrator or owner of the VMs 1506-1511 may be alerted to the abnormally high response times and memory spikes occurring after time t. Methods and systems described below may be used to determine a correlation between the response time and the virtual memory, a correlation between the virtual memory and the CPU contention, and a correlation between the virtual memory and the response time. The system administrator or owner may determine that the correlation between the virtual memory and the response time is a less significant indicator of the problem than the correlation between the response time and the CPU contention and the correlation between the virtual memory and the CPU contention. Methods and systems described below enable a system administrator or application owner to associate an alert with the combination of correlations between the response time and virtual memory with the CPU contention such that when the same alert is triggered in the future with the same combination of correlations, the administrator or application owner may immediately recognize the problem and immediately execute appropriate remedial measures to correct the problem. For example, the administrator or owner may have determined that the problem with CPU contention leads to delayed response times and memory spikes at VMs 1506 and 1508, respectively, and is resolved by increasing virtual CPU usage for the VM 1522 at the server computer $SC_5$. Methods and systems may automatically execute a script program that increases virtual CPU usage for the VM 1522 when the alert with the same combination of correlations is detected.

Methods and systems compute correlations between a selected metric, $v_s(t)$, of an object in an object topology and metrics, $v_m(t)$, of other objects in the object topology, where $v_s$ denotes the name of the selected metric, $v_m$ denotes the name of the metric associated with objects of the object topology, where index m=1, . . . , M, and M is the number of metrics in the object topology, excluding the selected metric. The metric values of the selected metric and the metric values of the other metrics of the object topology may have been generated with different intervals between time stamps, the intervals may not be uniform, and the time stamps of the metric values may not be aligned in time. For example, metric data associated with different resources of an object may be generated periodically at regular intervals and the time stamps of the metric values may be aligned in time. On the other hand, metrics of other resources may be generated nonperiodically and the time stamps of the metric values are not aligned in time. In certain cases, the operations manager 1332 may request metric data from data sources at regular intervals, while in other cases, the metrics may be sent to the operations manager 1332 at periodic intervals or whenever metric data becomes available. As a result, the metric values of the selected metric and the metric values of other metrics of the object topology may not be time aligned.

In order to compute correlations of the selected metric with each metric of an object topology, the selected metric and other metrics may be aligned in time with a general set of uniformly spaced time stamps. Metric values may be aligned in time by computing a running-time average of metric values in a sliding time window centered at each time stamp of the general set of uniformly spaced time stamps. In an alternative implementation, the metric values with time stamps in the sliding time window may be smoothed by computing a running time median of metric values in the sliding time window centered at each time stamp of the general set of uniformly spaced time stamps. Methods and systems may also align in time the metrics by deleting time stamps of missing metric values or interpolating missing metric data at time stamps of the general set of uniformly spaced time stamps using interpolation, such as linear, quadratic, or spline interpolation. After the selected metric and the other metrics of the object topology have been time aligned, correlations are computed for the selected metric $v_s$ with each metric $v_m$.

In one implementation, for each metric $v_m$, a correlation between the metric $v_m$ and the selected metric $v_s$ may be computed using a product-moment correlation coefficient ("PMCC") given by:

$$\rho_{pm}(v_s, v_m) = \left| \frac{1}{N} \sum_{i=1}^{N} \left( \frac{x_{i,s} - \mu_s}{\sigma_s} \right) \left( \frac{x_{i,m} - \mu_m}{\sigma_m} \right) \right| \qquad (2)$$

where $$\mu_s = \frac{1}{N} \sum_{i=1}^{N} x_{i,s}$$

$$\sigma_s = \sqrt{\frac{1}{N} \sum_{i=1}^{N} (x_{i,s} - \mu_s)}$$

$$\mu_m = \frac{1}{N} \sum_{i=1}^{N} x_{i,m}$$

and $$\sigma_m = \sqrt{\frac{1}{N} \sum_{i=1}^{N} (x_{i,m} - \mu_m)}$$

In another implementation, for each metric $v_m$, a correlation between the metric $v_m$ and the selected metric $v_s$ may be computed using a distance correlation. The distance correlation is executed by computing an N×N distance matrix for the selected metric $v_s$ with matrix elements given by $$a_{j,k} = \sqrt{x_{j,s}^2 - z_{k,s}^2} \qquad (3a)$$

where j, k=1, 2, . . . , N.

The matrix elements of Equation (3a) are doubly centered to obtain a doubly centered distance matrix for the selected metric $v_s$ with matrix elements given by $$A_{j,k} = a_{j,k} - \bar{a}_j - \bar{a}_k + \bar{a} \qquad (3b)$$

where $$\bar{a}_j = \frac{1}{N} \sum_{k=1}^{N} a_{j,k}$$

$$\bar{a}_k = \frac{1}{N} \sum_{j=1}^{N} a_{j,k}$$

and $$\bar{a} = \frac{1}{2N} \left( \sum_{j=1}^{N} \bar{a}_j + \sum_{k=1}^{N} \bar{a}_k \right)$$

For each metric $v_m$, matrix elements of a corresponding N×N distance matrix are given by $$b_{j,k} = \sqrt{x_{j,m}^2 - x_{k,m}^2} \qquad (4a)$$

where j, k=1, 2, . . . , N.

The matrix elements of Equation (4a) are doubly centered to obtain a doubly centered distance matrix for the metric $v_m$ with matrix elements given by $$B_{j,k} = b_{j,k} - \bar{b}_j - \bar{b}_k + \bar{b} \qquad (4b)$$

where $$\bar{b}_j = \frac{1}{N} \sum_{k=1}^{N} b_{j,k}$$

$$\bar{b}_k = \frac{1}{N} \sum_{j=1}^{N} b_{j,k}$$

and $$\bar{b} = \frac{1}{2N} \left( \sum_{j=1}^{N} \bar{b}_j + \sum_{k=1}^{N} \bar{b}_k \right)$$

The distance correlation coefficient is given by $$\rho_{dc}(v_s, v_m) = \frac{d\text{Cor}(v_s, v_m)}{\sqrt{d\text{Var}(v_s) d\text{Var}(v_m)}} \qquad (5)$$

where

-continued $$d\text{Cor}(v_s, v_m) = \frac{1}{N^2} \sum_{j=1}^{N} \sum_{k=1}^{N} A_{j,k} B_{j,k}$$

$$d\text{Var}(v_s) = \frac{1}{N^2} \sum_{j=1}^{N} \sum_{k=1}^{N} A_{j,k}^2$$

and $$d\text{Var}(v_m) = \frac{1}{N^2} \sum_{j=1}^{N} \sum_{k=1}^{N} B_{j,k}^2$$

In another implementation, for each metric $v_m$, a correlation between the metric $v_m$ and the selected metric $v_s$ may be computed using rank correlation. A rank correlation coefficient is computed using the product-moment correlation coefficient of Equation (2) with elements of the selected metric $v_s$ and the metric $v_m$ rank ordered:

$$\rho_{rc}(v_s, v_m) = \rho_{pm}(rv_s, rv_m) = \frac{1}{N} \sum_{i=1}^{N} \left(\frac{rx_{i,s} - \mu_s}{\sigma_s}\right)\left(\frac{rx_{i,m} - \mu_m}{\sigma_m}\right) \quad (6)$$

where $$rv_s = (rx_{i,s})_{i=1}^{N}$$

and $$rv_m = (rx_{i,m})_{i=1}^{N}$$

Elements of the rank ordered selected metric, $rv_s$, and the rank ordered metric, $rv_m$, may be obtained by rank ordering elements of the corresponding selected metric $v_s$ and the metric $v_m(t)$ from largest to smallest (or smallest to largest). For example, $rx_{1,s}$ may be assigned the largest element in $v_s$, $rx_{2,s}$ may be assigned the second largest element in $v_s$ and so on with the final element $rx_{N,s}$ assigned the smallest element in $v_s$. The elements of the rank ordered metric $rv_m$ are obtained in the same manner.

Correlation coefficients are computed for the selected metric $v_s$ and the other metrics $v_m$ of an object topology in a recent time interval as follows. 1) Correlation coefficients are computed for the selected metric and other metrics of the object associated with the selected metric. 2) Correlation coefficients are computed for the selected metric and other metrics of objects at the same level of the object topology. 3) Correlation coefficients are computed for the selected metric and other metrics of objects at different levels of the object topology. 4) Correlation coefficients may be computed for the selected metric and other metrics outside the object topology as selected by a user, such as by a system administrator or an application owner.

Figure 16A:
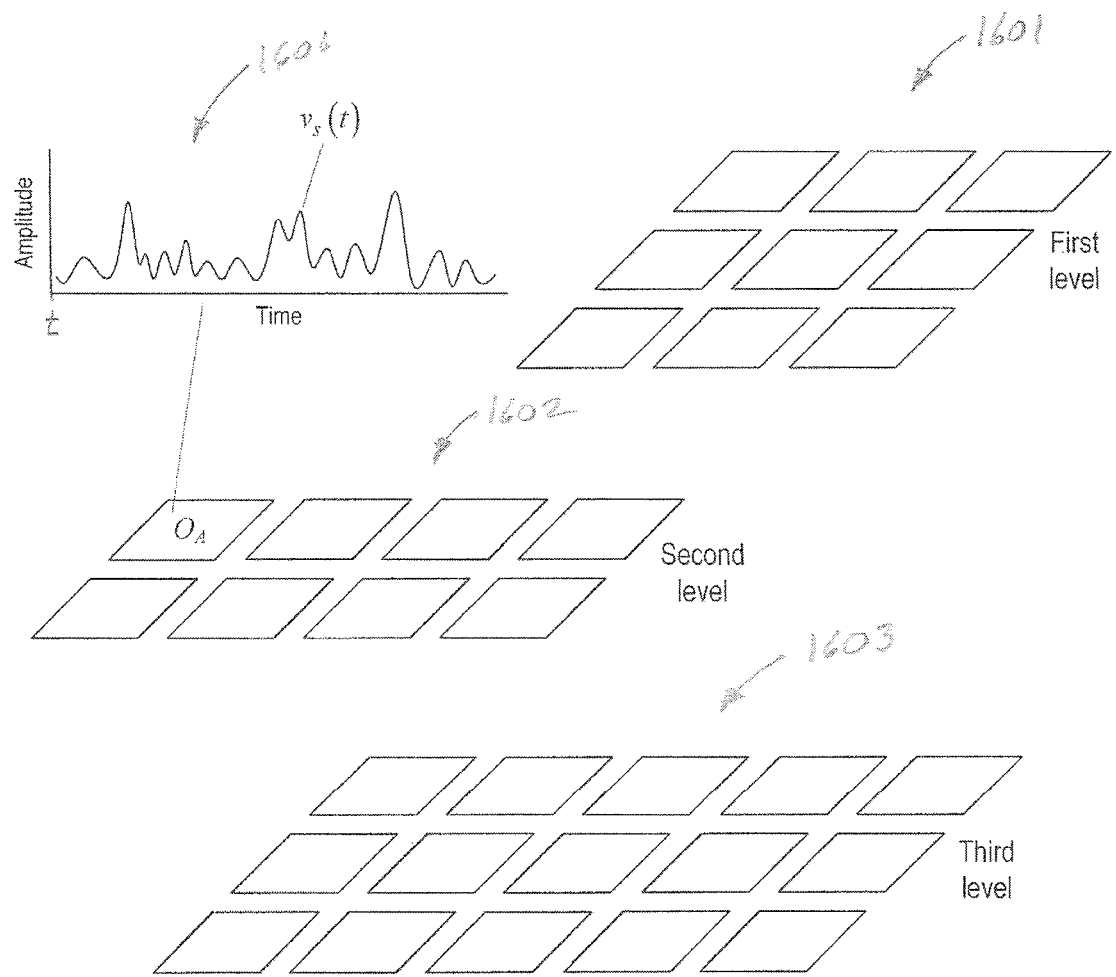
FIG. 16A shows an example object topology comprising three levels of data center objects.

FIG. 16A shows an example object topology comprising three levels 1601-1603 of data center objects. Each object is represented by a rectangle. The objects may be virtual objects or physical objects. FIG. 16A shows a plot 1606 of metric data of a selected metric $v_s$ associated with an object, $O_A$. The time axis represents a recent time interval that begins at time t, where t denotes point in time that may be selected by a system administrator after which correlations between the selected metric and other metrics of the object topology are computed. The selected metric $v_s$ may have been selected for investigation by a system administrator. Alternatively, the selected metric $v_s$ may have been identified because recently generated metric values violated a threshold for the metric, indicating a performance problem with the object $O_A$. If the object $O_A$ is a physical object, such as a server computer, the selected metric $v_s$ may represent CPU usage, memory usage, network throughput, request per second, error rates, average response time, CPU contention, uptime, and thread count just to name a few. If the object $O_A$ is a virtual object, such as a virtual machine, the selected metric $v_s$ may represent virtual CPU usage, virtual memory usage, virtual network throughput, request per second, error rates, and average response time just to name a few.

FIGS. 16B-16E show example correlation coefficients calculated over the recent time interval for the selected metric and metrics of objects in different levels of the object topology shown in FIG. 16A. Objects of the object topology are denoted by $O_Y$ with associated metrics denoted by $v_{m,Y}^x$, where the subscript Y identifies the object and the superscript x is a numerical value that distinguishes different metrics of the object. For example, the metrics $v_{m,Y}^1$ and $v_{m,Y}^2$ may represent CPU usage and memory usage of the object $O_Y$. A correlation coefficient, $\rho$, is computed for the selected metric with each of the other metrics in the object topology. The correlation coefficient $\rho$ represents the PMCC, the distance correlation, or the rank correlation.

Figure 16B:
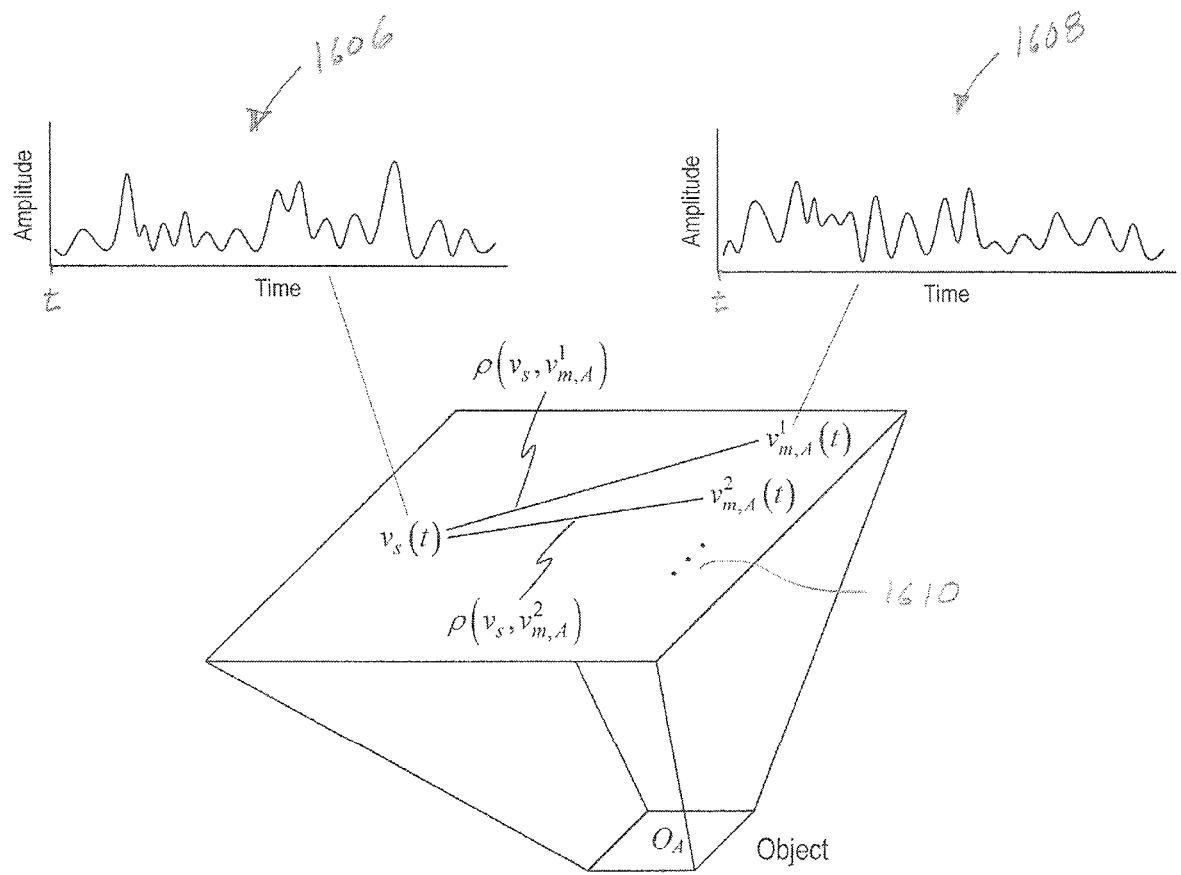
FIGS. 16B-16E show examples correlation coefficients calculated for a selected metric and metrics of objects in the levels of the object topology shown in FIG. 16A.

FIG. 16B shows correlation coefficients for the selected metric and other metrics of the object $O_A$. The object $O_A$ is enlarged to represent computation of correlations for the selected metric $v_s$ with other metrics $v_{m,A}^1$, $v_{m,A}^2$, . . . associated with the object $O_A$. FIG. 16B shows a plot 1608 of metric data of the metric $v_{m,A}^1$ in the recent time interval. Ellipsis 1610 denotes other metrics of the object $O_A$ that are not represented. A correlation coefficient is computed for the selected metric with each of the other metrics. For example, $\rho(v_s, v_{m,A}^1)$ is the correlation coefficient for the selected metric $v_s$ and the metric $v_{m,A}^1$ and $\rho(v_s, v_{m,A}^2)$ is the correlation coefficient between of the selected metric $v_s$ and the metric $v_{m,A}^2$.

Figure 16C:
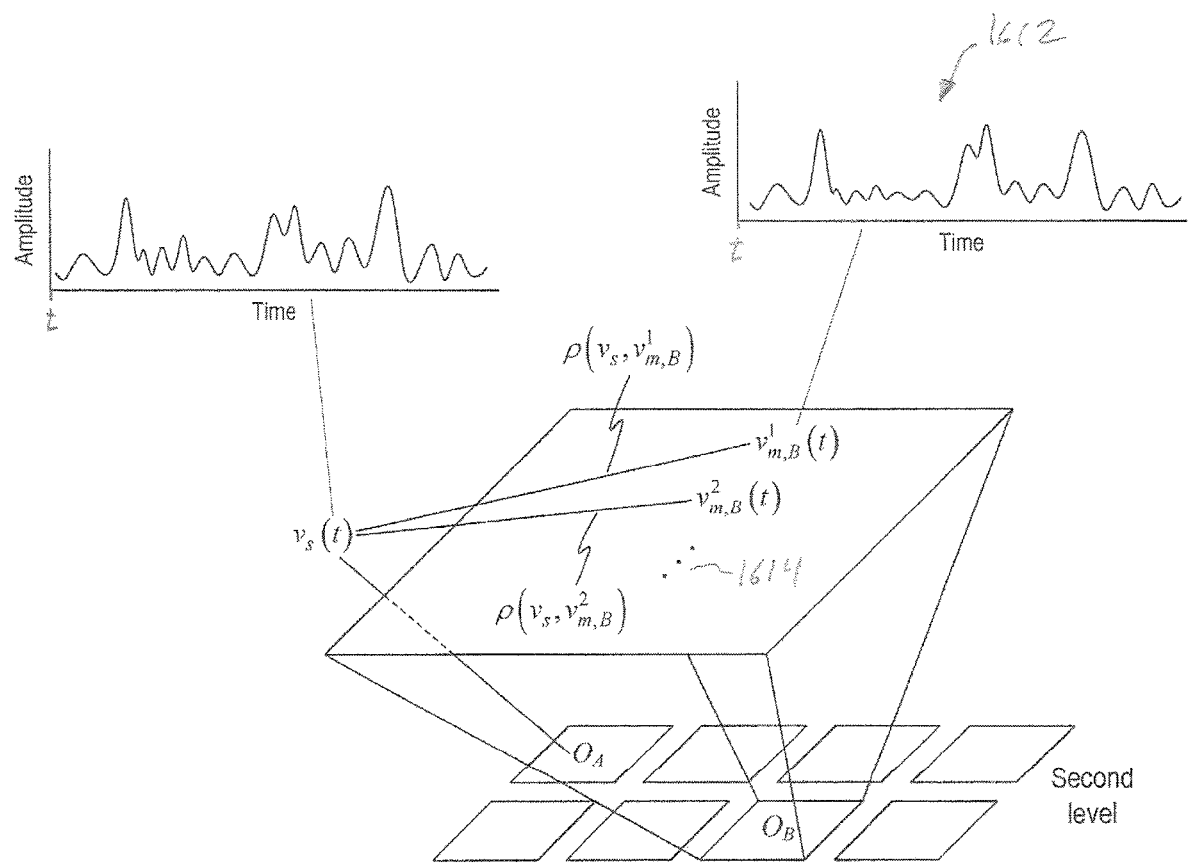

FIG. 16C shows correlation coefficients for the selected metric and metrics of objects in the second level. An object $O_B$ represents an object in the second level 1602 and is shown enlarged to represent computation of correlations for the selected metric $v_s$ with metrics $v_{m,B}^1$, $v_{m,B}^2$, . . . of the object $O_B$. FIG. 16C shows a plot 1612 of metric data of the metric $v_{m,B}^1$ in the recent time interval. Ellipsis 1614 denotes other metrics of the object $O_B$, that are not represented. A correlation is computed for the selected metric with each of the metrics associated with the object $O_B$ and for the metrics of other objects in the second level. For example, $\rho(v_s, v_{m,B}^1)$ is the correlation coefficient between the selected metric $v_s$ and the metric $v_{m,B}^1$ and $\rho(v_s, v_{m,B}^2)$ is the correlation coefficient between of the selected metric $v_s$ and the metric $v_{m,B}^2$.

Figure 16D:
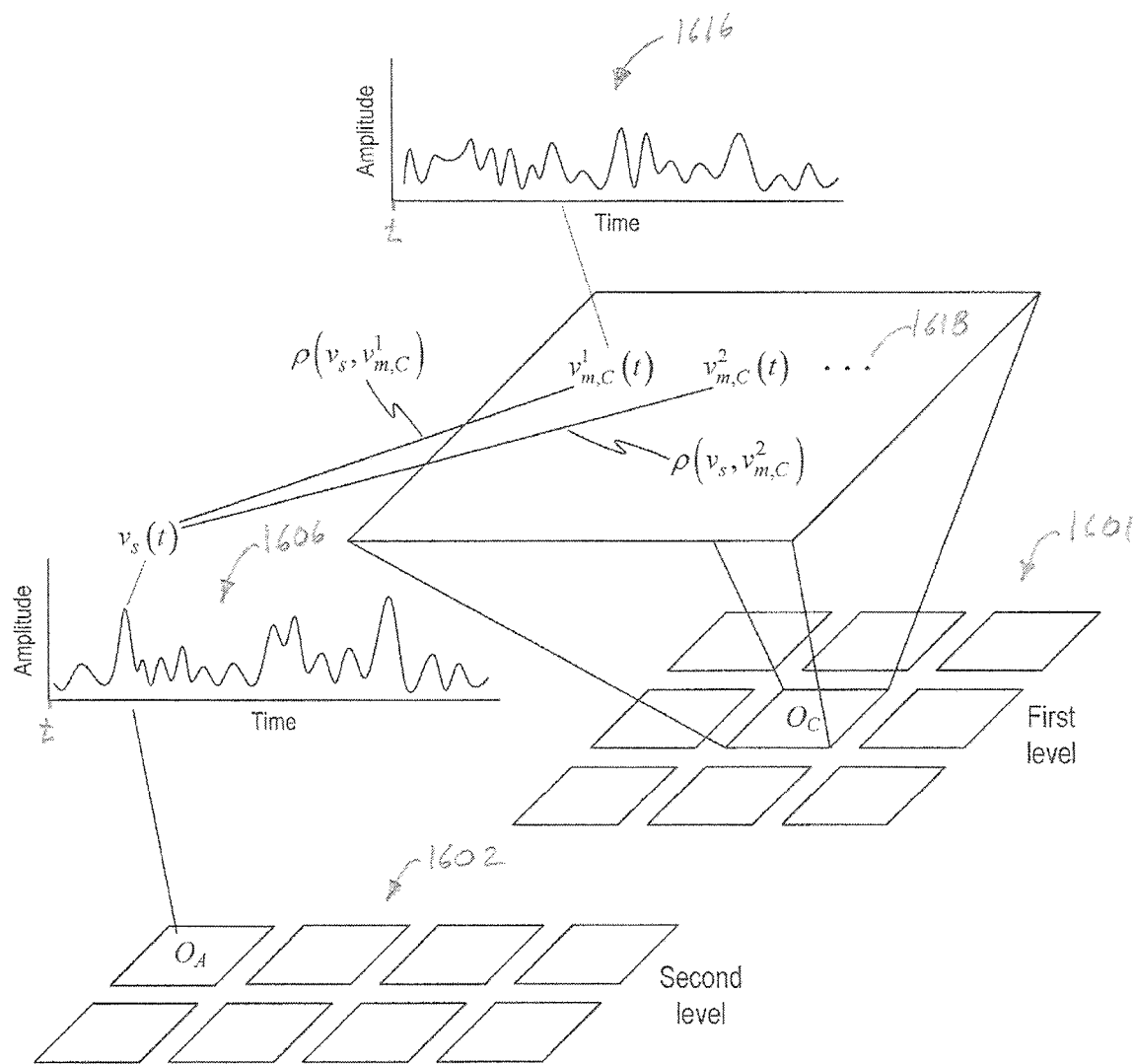

FIG. 16D shows correlations for the selected metric with metrics of objects in the first level. An object $O_C$ represents an object in the first level 1601 and is shown enlarged to represent computation of correlations for the selected metric $v_s(t)$ with metrics $v_{m,C}^1$, $v_{m,C}^2$, . . . of the object $O_C$. FIG. 16D shows a plot 1616 of metric data of the metric $v_{m,C}^1$ in the recent time interval. Ellipsis 1618 denotes other metrics of the object $O_C$ that are not represented. A correlation is computed for the selected metric with each of the metrics associated with the object $O_C$ and for the metrics of other objects in the first level. For example, $\rho(v_s, v_m,c)$ is the correlation coefficient between the selected metric $v_s$ and the metric $v_{m,C}^1$ and $\rho(v_s, v_{m,C}^2)$ is the correlation coefficient between of the selected metric $v_s$ and the metric $v_{m,C}^2$.

Figure 16E:
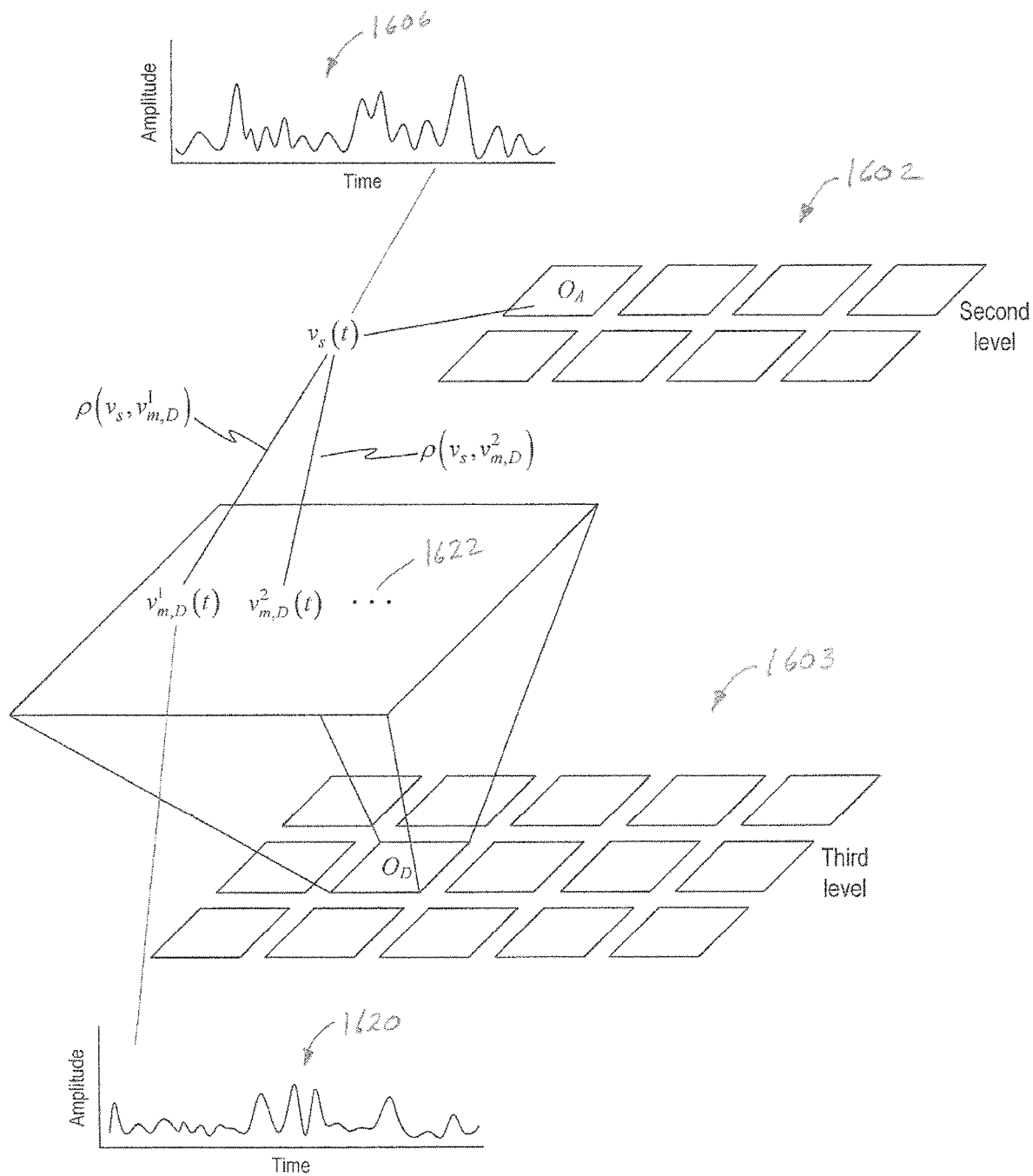

FIG. 16E shows correlations for the selected metric with metrics of objects in the first level. An object $O_D$ represents an object in the third level 1602 and is shown enlarged to represent computation of correlations for the selected metric $v_s$ with metrics $v_{m,D}^1, v_{m,D}^2, \ldots$ of the object $O_D$. FIG. 16E shows a plot 1620 of metric data of the metric $v_{m,D}^1$ in the recent time interval. Ellipsis 1622 denotes other metrics of the object $O_C$ that are not represented. A correlation is computed for the selected metric with each of the metrics associated with the object $O_D$ and for the metrics of other objects in the third level. For example, $\rho(v_s, v_{m,D}^1)$ is the correlation coefficient between the selected metric $v_s$ and the metric $v_{m,D}^1$ and $\rho(v_s, v_{m,D}^2)$ is the correlation coefficient between of the selected metric $v_s$ and the metric $v_{m,D}^2$.

Correlation coefficients of a selected metric and metrics of objects in an object topology computed over a recent time interval may be compared to a correlation threshold to determined which metrics are correlated with the selected metric. A metric $v_{m,Y}^x(t)$ is identified as correlated with the selected metric $v_s(t)$ when the following condition is satisfied:

$$\rho(v_s, v_{m,Y}^x) > Th_{cor} \tag{7}$$

where $Th_{cor}$ is a correlation threshold; and $0 < Th_{cor} < 1$ (e.g., $Th_{cor} = 0.80$).

If none of the metrics of objects in the object topology satisfy the condition given by Equation (7) for one of the correlation techniques, the process of computing correlation coefficients for the selected metric with the metrics of the object topology may be repeated for a different correlation technique. For example, if none of the correlation coefficients computed using PMCC satisfy the condition given by Equation (7), computation of the correlation coefficients for the selected metric with the metrics of the objects in the object topology may be repeated using the distance correlation of Equation (5) or the rank correlation of Equation (6). The metrics and associated correlation coefficients may be stored in an unexpected metric file. The correlation coefficients that satisfy the condition in Equation (7) are used to rank order the corresponding metrics. The metric with the largest correlation coefficient over the recent time interval is assigned the highest rank. The metric with the second largest correlation coefficient over the recent time interval is assigned the second highest rank and so on.

FIG. 17 shows an example table of rank ordered metrics of objects of an object topology. Column 1701 list the rank with the number 1 corresponding to the highest rank. Column 1702 list correlation coefficients for the selected metric $v_s$ with metrics of objects of the object topology that satisfy the condition represented by Equation (7). Column 1703 list the metrics with correlation coefficients in column 1702. In this example, the metric $v_{m,C}^3$ has the highest correlation with the selected metric $v_s$. The metric $v_{m,F}^1$ has the second highest correlation with the selected metric $v_s$.

The list of rank ordered correlated metrics may be reduced to a rank ordered list of unexpected metrics by discarding correlated metrics that are correlated with the selected metric over the recent time interval and are correlated with the selected metric over historical time intervals when the objects in the object topology exhibited normal behavior. The unexpected metrics are metrics that have not historically been correlated with the selected metric and may be useful in troubleshooting a performance problem.

FIG. 18 shows an example of reducing the list of rank ordered correlated metrics to a rank order list of unexpected metrics by discarding metrics in the table of FIG. 17 that are correlated with the selected metric over historical time intervals when the objects in the object topology exhibited normal behavior. FIG. 18 shows an example table of historical rank ordered metrics of objects in the object topology. Column 1801 list the historical rank ordered metrics. Column 1802 list the top ten correlation coefficients for the selected metric with metrics of the objects of the object topology over historical time intervals when the objects in the object topology exhibited normal behavior. Column 1803 list the metrics that correspond to the correlation coefficients in column 1802. Lines 1804-1806 identify three recent rank ordered metrics that are historically rank ordered metrics. Lines 1808-1810 represent discarding the metrics that are historically correlated with the selected metric to obtain a list of rank ordered unexpected metrics listed in column 1812.

Figure 19A:
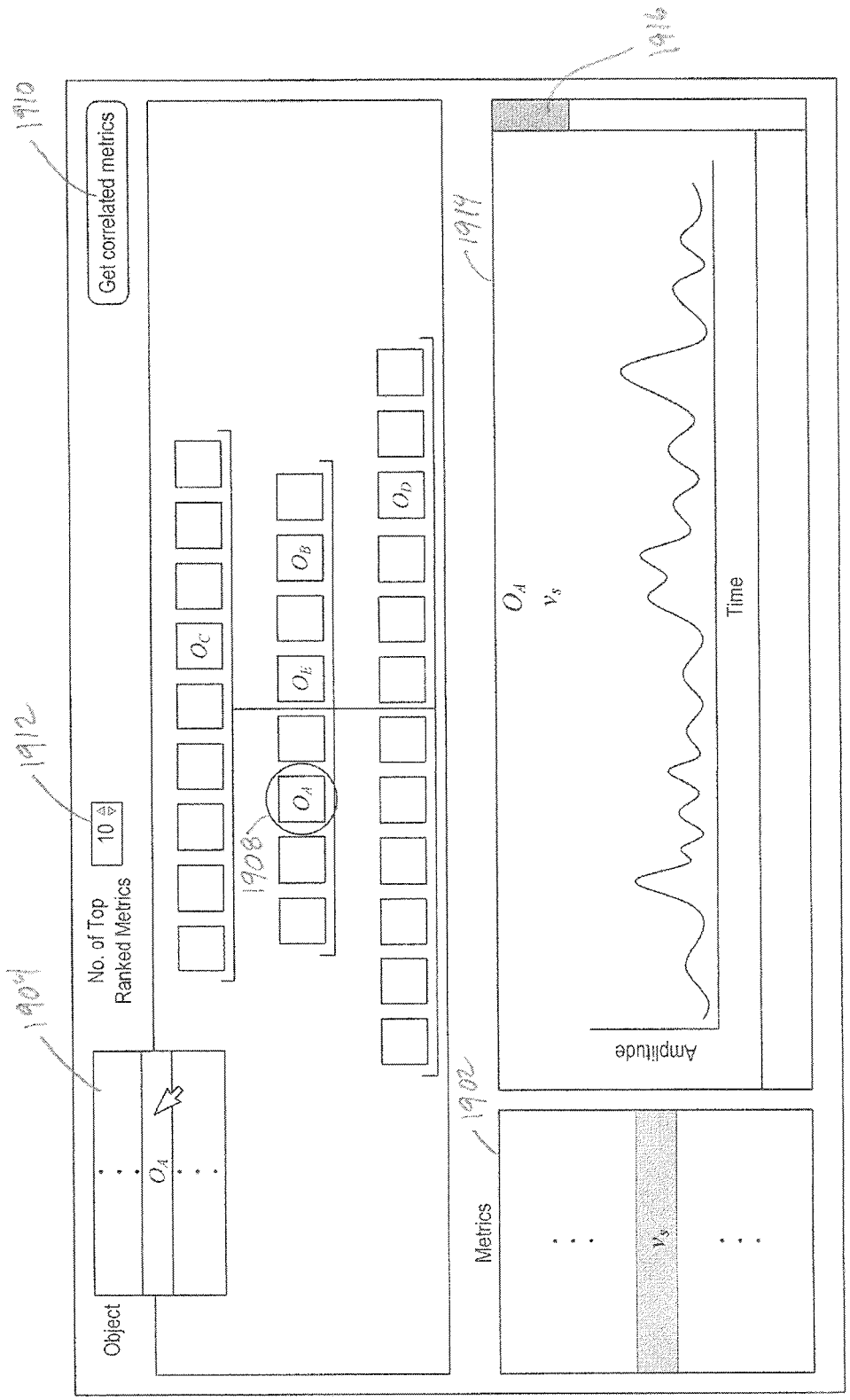
FIGS. 19A-19C show an example graphical use interface ("GUI") that enables a user to select a metric and view correlated metrics.
Figure 19B:
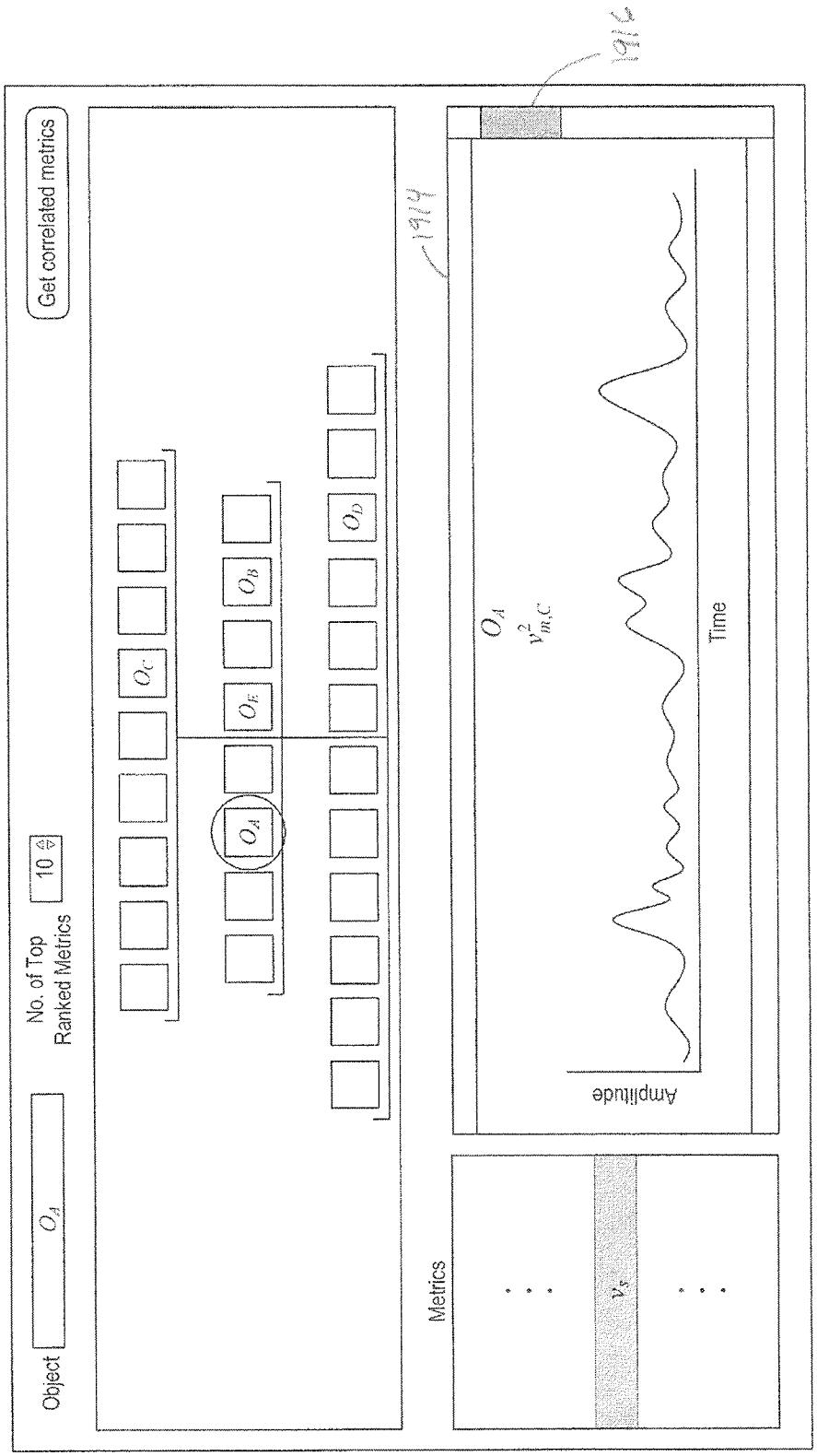
Figure 19C:
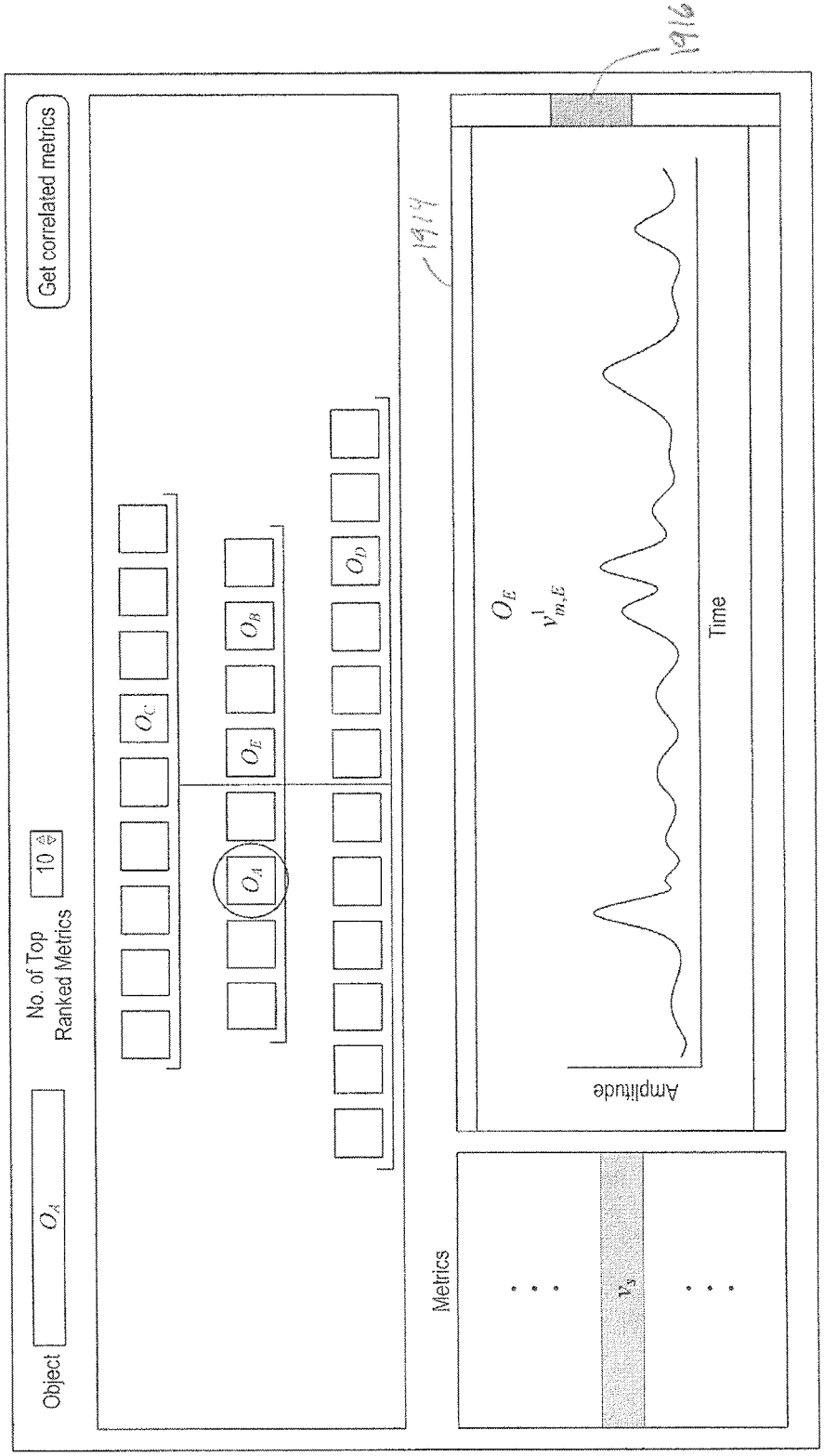

FIGS. 19A-19C show an example graphical use interface ("GUI") that enables a user to select a metric and view correlated metrics of the object topology described above with reference to FIGS. 16A-16E. In FIG. 19A, names of the metrics are listed in a metrics window 1902. In this example, a user has selected the selected metric $v_s$, described above as indicated by shading. The user may have selected the selected metric because an alert was previously generated indicating that the selected metric violated an associated threshold or an alert may have been generated indicating that a problem has occurred with the object $O_A$. The user selects objects of an object topology to compute correlations with the selected metric using a drop-down menu 1904. The object topology associated with the selected metric is displayed in window 1906 with the object associated with the selected metric identified by a circle 1908. The user then initiates the process of determining correlated metrics of objects in the object topology by clicking on the "Get correlated metrics" button 1910. In field 1912, the user may also select a number of highest ranked unexpected metrics that are correlated with the selected metric to view in window 1914. The user may then view the selected metric and the highest ranked unexpected metrics that are correlated with the selected metric using the scroll bar 1916. FIGS. 19B and 19C show example plots of the two highest ranked unexpected metrics of FIG. 18.

After executing processes for determining unexpected metrics that are correlated with the selected metric, a user may rate the unexpected metrics that were helpful in troubleshooting the problem associated with the selected metric. Poorly rated unexpected metrics may be discarded from the list of recommended metrics. By contrast, highly rated unexpected metrics may be used to troubleshoot the performance problem and are saved to troubleshoot and generate recommendations for remedying the problem in the future.

FIGS. 20A-20B show a GUI with a user rating window used to assign a user rating to each of the top ranked unexpected metrics. In FIG. 20A, the GUI list the unexpected metrics in a column 2002 and associated correlation coefficients in a column 2004 obtained as described above with reference to FIG. 18. Column 2006 list five-star ratings the user may use to rate each unexpected metric. In this example, a user selects a rating ranging from zero to five stars, where a zero-star rating for an unexpected metric indicates the user did not find the metric helpful in troubleshooting the problem with the object $O_A$ and an unexpected metric with a five-star rating indicates the user found the metric very helpful in troubleshooting the performance problem. FIG. 20B shows an example of user ratings assigned to each of the top ranked unexpected metrics. For example, unexpected metrics $v_{m,C}^2$ and $v_{m,A}^1$ have been assigned five-star ratings indicating the metrics where very helpful in troubleshooting the performance problem. By contrast, unexpected metrics $v_{m,E}^1$ and $v_{m,D}^3$ have been assigned zero-star ratings indicating these metrics where not help in troubleshooting the performance problem.

The user may specify a rating cutoff for discarding unexpected metrics regarded as not helpful in troubleshooting a performance problem. For example, metrics with user rating below a three-star rating may be discarded from the list of rank order unexpected metrics. The list of rank ordered unexpected metrics may be reorganized by discarding metrics with a user rating below the rating cutoff and the unexpected metrics with user ratings above the cutoff may be re-ranked according to the associated user ratings. FIG. 20C shows unexpected metrics with ratings below three stars discarded as indicated by lines through the metric name and unexpected metrics with user ratings greater than or equal to three stars rank ordered according to the user ratings.

When the selected metric $v_s$ is selected again in the future, the highest rated unexpected metrics are displayed in a GUI along with any other metrics with correlation coefficients that satisfy the condition given by Equation (7). The poorly rated unexpected metrics may be excluded from the list. FIG. 20D shows a GUI that list the highest user rated unexpected metrics obtained as described above with reference to FIGS. 20B-20C and unexpected metrics determined for a most recent time interval. The top five entries are the five highest user rated unexpected metrics determined from a previously executed search for unexpected metrics and list the recently determined unexpected metrics with corresponding correlation coefficients that satisfy the correlation condition given by Equation (7). The user may also rate the unexpected metrics.

Methods and systems may also maintain a record of frequently or periodically occurring unexpected metrics to immediately identify and remedy performance problems. A system administrator or application owner may identify a performance problem associated with a set of unexpected metrics obtained as described above and determine remedial measures for correcting the performance problem. Different frequently or periodically occurring sets of unexpected correlation metrics corresponding to different performance problems and remedial measures may be stored in a data storage device.

FIG. 21 shows a table of ten frequently occurring unexpected metrics that are correlated with the selected metric $v_s$. The top row of columns 2101 identify examples of frequently occurring unexpected metrics with the selected metric $v_s$. For example, entry 2102 represents an unexpected metric $v_{m,A}^2$ and the selected metric $v_s$ in which the correlation coefficient $\rho(v_{m,A}^2, v_s)$ has repeatedly satisfied the condition given by Equation (7). The "X's" in rows of columns 2101 identify combinations of frequently occurring correlations between unexpected metrics and the selected metric. Column 2103 list problems associated with different combinations of unexpected metrics correlated with the select metric. For example, Problem (1) may be CPU contention at a host server computer, Problem (2) may be virtual memory usage exceeded a threshold, Problem (3) may be average response time exceeds a limit, and Problem (4) may be the number of thread counts for a server computer has exceeded a threshold. Column 2104 list remedial measures that may be taken to correct the corresponding problems listed in column 2103, such as allocating more CPU usage to VMs, increasing virtual memory or CPU to VMs, and migrating VMs to a different server computers. For example, the fourth row indicates that when correlation coefficients $\rho(v_s, v_{m,A}^1)$, $\rho(v_s, v_{m,C}^2)$, $\rho(v_s, v_{m,C}^3)$ and $\rho(v_s, v_{m,D}^3)$ satisfy the condition given by Equation (7) and the correlation coefficients $\rho(v_s, v_{m,A}^2)$, $\rho(v_s, v_{m,B}^2)$, $\rho(v_s, v_{m,B}^4)$, $\rho(v_s, v_{m,D}^2)$, $\rho(v_s, v_{m,D}^4)$, and $\rho(v_s, v_{m,A}^5)$ do not satisfy the condition given by Equation (7), the performance problem is "Problem (4)" and remedial measures "Measure (4)" is recommended to resolve the performance problem.

The methods described below with reference to FIGS. 22-25 are stored in one or more data-storage devices as machine-readable instructions that when executed by one or more processors of the computer system, such as the computer system shown in FIG. 1, troubleshoot anomalous behavior in a data center.

Figure 22:
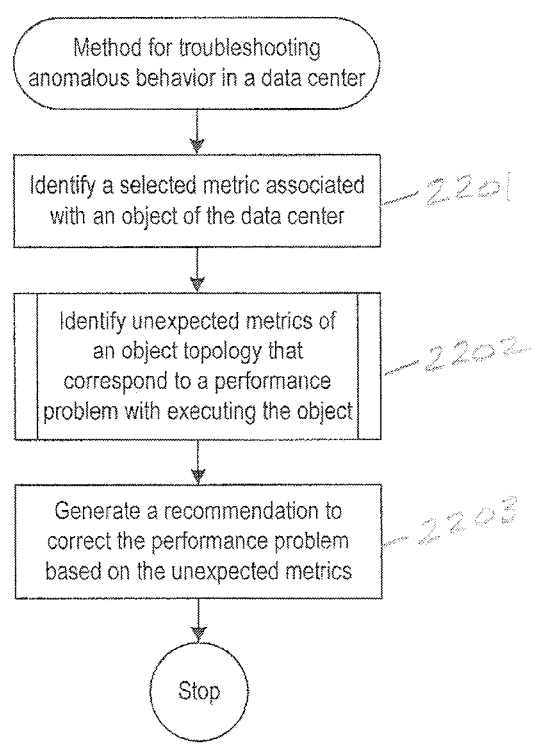
FIG. 22 is a flow diagram illustrating an example implementation of a "method for troubleshooting anomalous behavior in a data center."

FIG. 22 is a flow diagram illustrating an example implementation of a "method for troubleshooting anomalous behavior in a data center." In block 2201, a selected metric associated with an object of a data center is identified. In block 2202, an "identify unexpected metrics of an object topology of the data center that correspond to a performance problem with executing the object" procedure is performed. In block 2203, a recommendation to correct the performance problem based on the unexpected metrics is generated.

Figure 23:
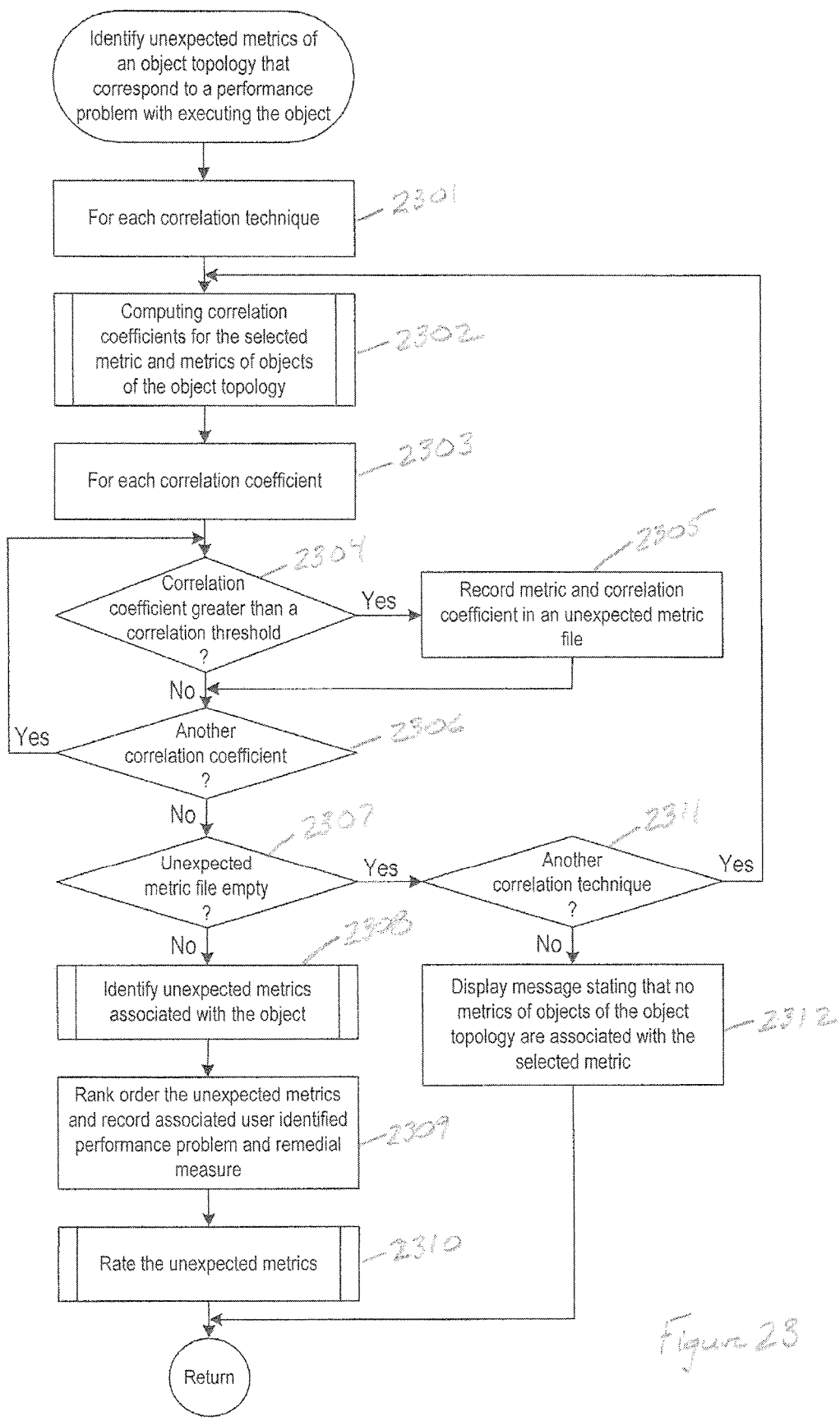
FIG. 23 is a flow diagram illustrating an example implementation of the "identify unexpected metrics of an object topology of the data center that correspond to a performance problem with executing the object" procedure performed in FIG. 22.

FIG. 23 is a flow diagram illustrating an example implementation of the "identify unexpected metrics of an object topology of the data center that correspond to a performance problem with executing the object" procedure performed in step 2202 of FIG. 22. A loop beginning with block 2301 performs the computational operations represented by blocks 2302-2311. In block 2302, a "compute correlation coefficients for the selected metric and metrics of objects of the object topology" procedure is performed. A loop beginning with block 2304 performs the computational operations represented by blocks 2304-2306 for each correlation coefficient computed in block 2302. In decision block 2304, when a correlation coefficient is greater than a correlation threshold, as described above with reference Equation (7), control flows to 2305. Otherwise, control flows to decision block 2306. In block 2305, the metric and associated correlation coefficient that exceeds the correlation threshold are recorded in an unexpected metric file as described above with reference to FIG. 17. In decision block 2306, the operations represented by blocks 2304 and 2305 are repeated for other correlation coefficients. In decision block 2307, when the unexpected metric file is empty control flows to block 2311. Otherwise, control flows to block 2308. In block 2308, an "identify unexpected metrics associated with the object" procedure is performed. In block 2309, the unexpected metrics in the unexpected metric file are rank ordered as described above with reference to FIGS. 17 and 18 and an associated user-identified performance problem and remedial measure for correcting the performance problem are recorded. In block 2310, a "rate the unexpected metrics" procedure is performed. In decision block 2311, when the correlation techniques have been exhausted and the unexpected metric file is empty, control flows to block 2312. In block 2312, a message is displayed stating that no metrics of the objects of the object topology are associated with the selected metric.

Figure 24:
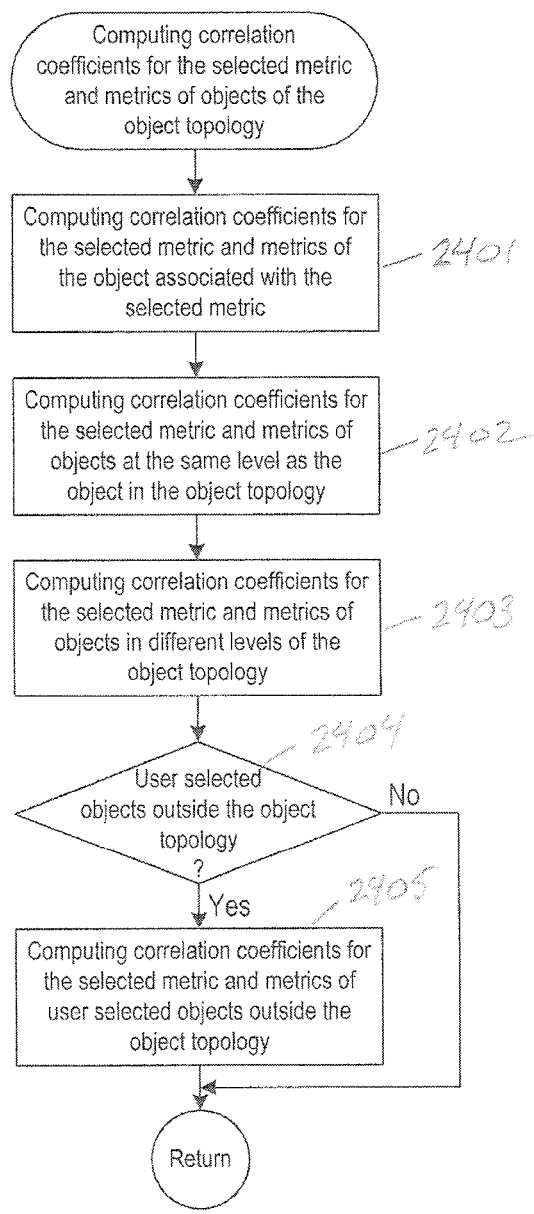
FIG. 24 is a flow diagram illustrating an example implementation of the "computing correlation coefficient for the selected metric and metrics of the object associated with the selected metric" procedure performed in FIG. 23.

FIG. 24 is a flow diagram illustrating an example implementation of the "computing correlation coefficient for the selected metric and metrics of the object associated with the selected metric" procedure performed in step 2302 of FIG. 23. In block 2401, correlation coefficients for the selected metric and metrics of the object associated with the selected metric are calculated. In block 2402, correlation coefficients for the selected metric and metrics of the objects at the same level as the object in the object topology are calculated. In block 2403, correlation coefficients for the selected metric and metrics of the objects in different levels of the object topology are calculated. In decision block 2404, when the user has selected objects outside the object topology control flows to block 2305. In block 2405, correlation coefficients for the selected metric and metrics of user objects outside the object topology are calculated.

Figure 25:
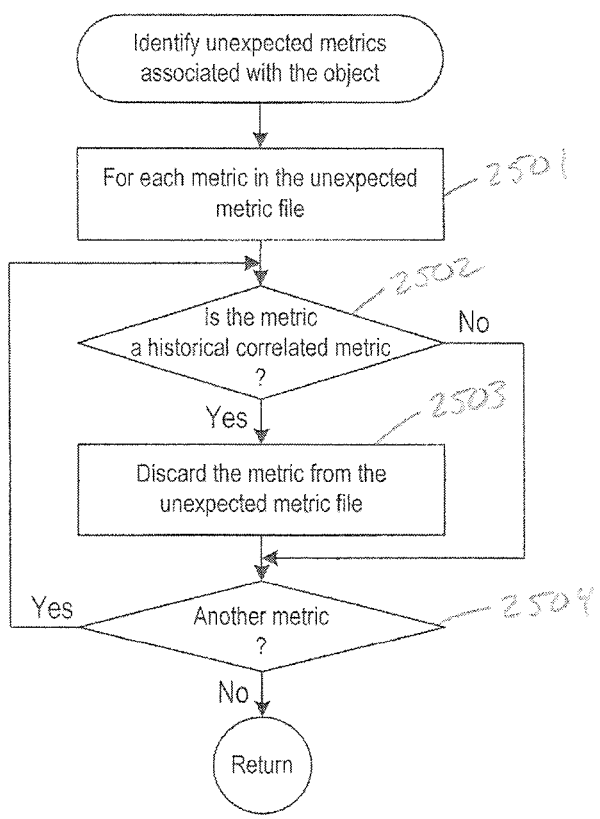
FIG. 25 is a flow diagram illustrating an example implementation of the "identify unexpected metrics associated with the object" procedure performed in FIG. 23.

FIG. 25 is a flow diagram illustrating an example implementation of the "identify unexpected metrics associated with the object" procedure performed in step 2308 of FIG. 23. A loop beginning with block 2501 repeats the operations represented by blocks 2502 and 2503 for each metric in the unexpected metric file. In decision block 2502, when the metric is a historically correlated metric with the selected metric as described above with reference to FIG. 18, the metric is discarded from the unexpected metric file in block 2503. The metrics remaining in the unexpected metric file are unexpected metric that are correlated with the selected metric. In decision block 2504, blocks 2502 and 2503 are repeated for another metric in the unexpected metric file.

Figure 26:
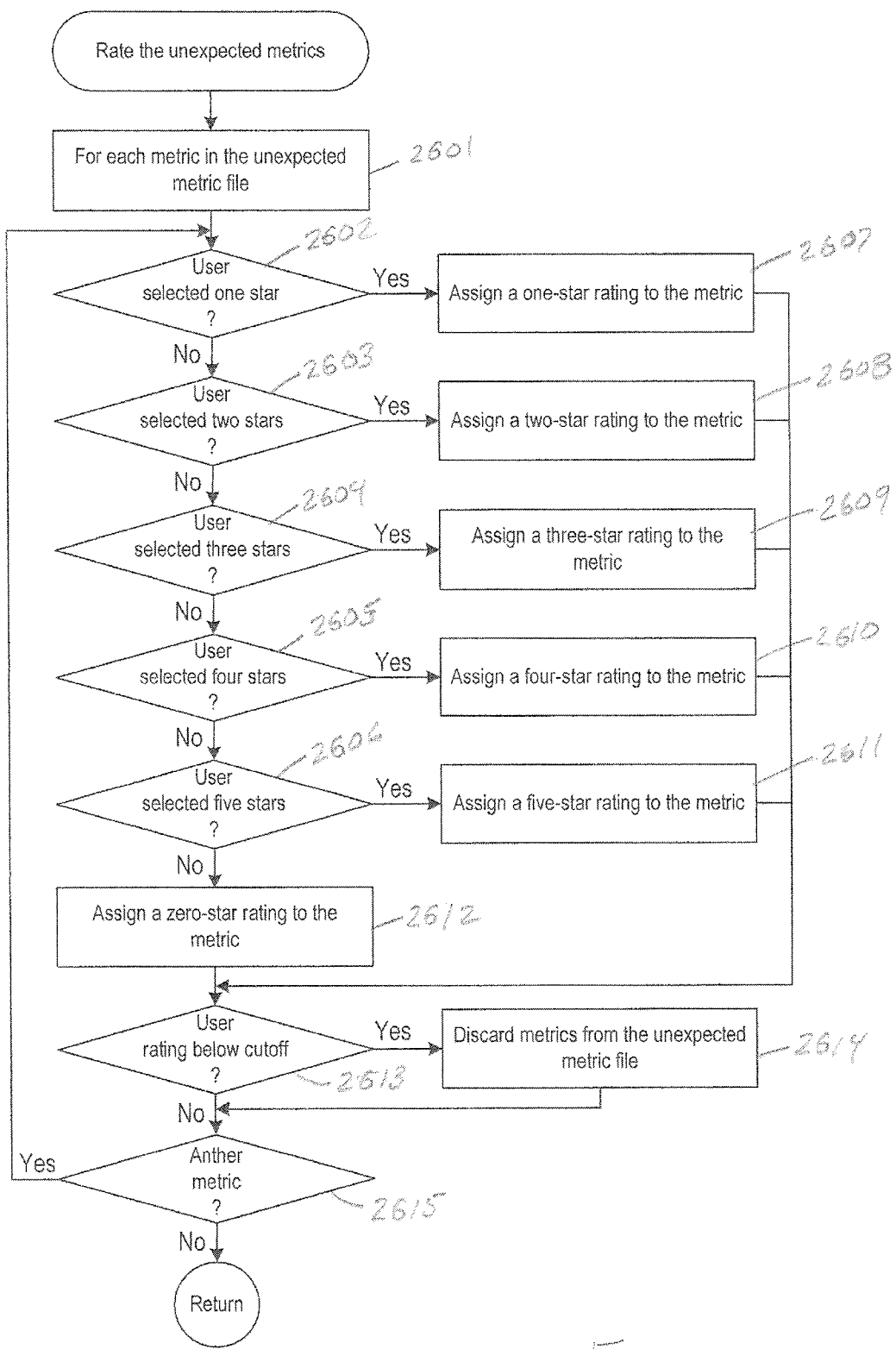
FIG. 26 is a flow diagram illustrating an example implementation of the "rate the unexpected metrics" procedure performed in FIG. 23.

FIG. 26 is a flow diagram illustrating an example implementation of the "rate the unexpected metrics" procedure performed in step 2310 of FIG. 23. A loop beginning with block 2501 repeats the operations represented by blocks 2502-2514 for each metric in the unexpected metric file. Decision blocks 2502-2506 represent a user's decision to rate a metric with a user rating ranging from zero stars to five stars as described above with reference to FIGS. 20A-20B. Blocks 2507-2512 represent assigning user rating selected in one of decision blocks 2502-2506 to the metric. In decision block 2513, when a user rating is below rating cutoff, the metric is discarded from the unexpected metric file in block 2514 as described above with reference to FIG. 20C. In decision block 2515, the operations represented by blocks 2502-2514 are repeated for another metric.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method stored in one or more data-storage devices and executed using one or more processors of a computer system for troubleshooting anomalous behavior in a data center, the method comprising:
providing a graphical user interface that enables a user to select a selected metric associated with an object of the data center experiencing a performance problem;
in response to the user selecting the selected metric, identifying unexpected metrics of an object topology of the data center that are correlated with the selected metric in a recent time interval and are uncorrelated with the selected metric in a historical time interval that precedes the recent time interval and corresponds to when the object did not exhibit the performance problem; and
generating a recommendation to correct the performance problem based on the unexpected metrics.

2. The method of claim 1 wherein identify unexpected metrics of the object topology of the data center comprises:
computing correlation coefficients for the selected metric and metrics of objects of the object topology in the recent time interval;
discarding metrics of objects of the object topology that are correlated with the selected metric in the historical time interval; and
for each correlation coefficient
when a correlation coefficient of a metric is greater than a correlation threshold, identifying the metric as an unexpected metric and recording the unexpected metric and associated correlation coefficient in an unexpected metric file, and
rank ordering the unexpected metrics in the unexpected metric file.

3. The method of claim 2 wherein computing correlation coefficients for the selected metric and metrics of objects of the object topology in the recent time interval comprises:
calculating correlation coefficients for the selected metric and metrics of the object associated with the selected metric;
calculating correlation coefficients for the selected metric and metrics of the objects at the same level as the object in the object topology;
calculating correlation coefficients for the selected metric and metrics of the objects in different levels of the object topology; and
calculating correlation coefficients for the selected metric and metrics of user identified objects outside the object topology.

4. The method of claim 1 further comprising:
providing a graphical user interface that enables the user to rate each unexpected metric;
assigning a user rating to each unexpected metric;
discarding unexpected metrics with corresponding user ratings that are less than a user-rating cutoff;
rank ordering the unexpected metrics with user ratings that are greater than or equal to the user-rating cutoff; and
annotating the unexpected metrics that the user associates with the performance problem.

5. The method of claim 1 further comprising:
determining a frequency of occurrence for a set of unexpected metrics;
identifying the performance problem associated with the set of unexpected metrics recording remedial measures for correcting the performance problem; and
generating a recommendation to execute the remedial measures for correcting the performance problem when unexpected metrics matches the set of unexpected metrics.

6. A computer system for troubleshooting anomalous behavior in a data center, the system comprising:
one or more processors;
one or more data-storage devices; and
machine-readable instructions stored in the one or more data-storage devices that when executed using the one or more processors controls the system to perform the operations comprising:
providing a graphical user interface that enables a user to select a selected metric associated with an object of the data center experiencing a performance problem;
in response to the user selecting the selected metric, identifying unexpected metrics of an object topology of the data center that are correlated with the selected metric in a recent time interval and are uncorrelated with the selected metric in a historical time interval that precedes the recent time interval and corresponds to when the object did not exhibit the performance problem; and
generating a recommendation to correct the performance problem based on the unexpected metrics.

7. The system of claim 6 wherein identify unexpected metrics of the object topology of the data center comprises:
computing correlation coefficients for the selected metric and metrics of objects of the object topology in the recent time interval;
discarding metrics of objects of the object topology that are correlated with the selected metric in the historical time interval; and
for each correlation coefficient
when a correlation coefficient of a metric is greater than a correlation threshold, identifying the metric as an unexpected metric and recording the unexpected metric and associated correlation coefficient in an unexpected metric file, and
rank ordering the unexpected metrics in the unexpected metric file.

8. The system of claim 7 wherein computing correlation coefficients for the selected metric and metrics of objects of the object topology in the recent time interval comprises:
calculating correlation coefficients for the selected metric and metrics of the object associated with the selected metric;
calculating correlation coefficients for the selected metric and metrics of the objects at the same level as the object in the object topology;
calculating correlation coefficients for the selected metric and metrics of the objects in different levels of the object topology; and
calculating correlation coefficients for the selected metric and metrics of user identified objects outside the object topology.

9. The system of claim 6 further comprising:
providing a graphical user interface that enables the user to rate each unexpected metric;
assigning a user rating to each unexpected metric;
discarding unexpected metrics with corresponding user ratings that are less than a user-rating cutoff;
rank ordering the unexpected metrics with user ratings that are greater than or equal to the user-rating cutoff; and
annotating the unexpected metrics that user has associated with the performance problem.

10. The system of claim 6 further comprising:
determining a frequency of occurrence for a set of unexpected metrics;
identifying the performance problem associated with the set of unexpected metrics recording remedial measures for correcting the performance problem; and
generating a recommendation to execute the remedial measures for correcting the performance problem when unexpected metrics matches the set of unexpected metrics.

11. A non-transitory computer-readable medium encoded with machine-readable instructions that implement a method carried out by one or more processors of a computer system to perform the operations comprising:
providing a graphical user interface that enables a user to select a selected metric associated with an object of the data center experiencing a performance problem;
in response to the user selecting the selected metric, identifying unexpected metrics of an object topology of the data center that are correlated with the selected metric in a recent time interval and are uncorrelated with the selected metric in a historical time interval that precedes the recent time interval and corresponds to when the object did not exhibit the performance problem; and
generating a recommendation to correct the performance problem based on the unexpected metrics.

12. The medium of claim 11 wherein identify unexpected metrics of the object topology of the data center comprises:
computing correlation coefficients for the selected metric and metrics of objects of the object topology in the recent time interval;
discarding metrics of objects of the object topology that are correlated with the selected metric in the historical time interval; and
for each correlation coefficient
when a correlation coefficient of a metric is greater than a correlation threshold, identifying the metric as an unexpected metric and recording the unexpected metric and associated correlation coefficient in an unexpected metric file, and
rank ordering the unexpected metrics in the unexpected metric file.

13. The medium of claim 12 wherein computing correlation coefficients for the selected metric and metrics of objects of the object topology in the recent time interval comprises:
calculating correlation coefficients for the selected metric and metrics of the object associated with the selected metric;
calculating correlation coefficients for the selected metric and metrics of the objects at the same level as the object in the object topology;
calculating correlation coefficients for the selected metric and metrics of the objects in different levels of the object topology; and
calculating correlation coefficients for the selected metric and metrics of user identified objects outside the object topology.

14. The medium of claim 11 further comprising:
providing a graphical user interface that enables the user to rate each unexpected metric;
assigning a user rating to each unexpected metric;
discarding unexpected metrics with corresponding user ratings that are less than a user-rating cutoff;
rank ordering the unexpected metrics with user ratings that are greater than or equal to the user-rating cutoff; and
annotating the unexpected metrics that user has associated with the performance problem.

15. The medium of claim 11 further comprising:
determining a frequency of occurrence for a set of unexpected metrics;
identifying the performance problem associated with the set of unexpected metrics recording remedial measures for correcting the performance problem; and
generating a recommendation to execute the remedial measures for correcting the performance problem when unexpected metrics matches the set of unexpected metrics.

* * * * *